(12) United States Patent
Chapman

(10) Patent No.: US 12,078,252 B2
(45) Date of Patent: Sep. 3, 2024

(54) MULTI-PORT ROTARY VALVE

(71) Applicant: Robert Bosch GmbH, Stuttgart (DE)

(72) Inventor: Thomas Chapman, Templeton, MA (US)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 17/852,515

(22) Filed: Jun. 29, 2022

(65) Prior Publication Data

US 2024/0003436 A1   Jan. 4, 2024

(51) Int. Cl.
*F16K 11/07* (2006.01)
*F01P 7/14* (2006.01)

(52) U.S. Cl.
CPC ............... *F16K 11/07* (2013.01); *F01P 7/14* (2013.01); *F01P 2007/146* (2013.01)

(58) Field of Classification Search
CPC .................................... F16K 11/07; F01P 7/14
See application file for complete search history.

(56) References Cited

U.S. PATENT DOCUMENTS

| | | | |
|---|---|---|---|
| 5,950,576 A | 9/1999 | Busato et al. | |
| 6,085,788 A | 7/2000 | Larson et al. | |
| 6,688,333 B2 | 2/2004 | McLane et al. | |
| 10,344,877 B2 | 7/2019 | Roche et al. | |
| 11,085,547 B2 | 8/2021 | Ma et al. | |
| 11,787,261 B1* | 10/2023 | Chapman | ................ B60L 58/27 |
| | | | 137/625.46 |
| 2023/0193906 A1* | 6/2023 | Chapman | .............. F16K 11/074 |
| | | | 123/450 |
| 2024/0001731 A1* | 1/2024 | Chapman | ............ F16K 11/0743 |
| 2024/0003444 A1* | 1/2024 | Chapman | ................ F16K 27/12 |

* cited by examiner

*Primary Examiner* — Kevin R Barss
(74) *Attorney, Agent, or Firm* — Kelly McGlashen

(57) ABSTRACT

A multi-port rotary disc valve includes a valve housing having a sidewall, a lid that closes a first end of the sidewall and a base that is disposed at a second end of the sidewall. A valve chamber is defined by the base, the lid and the sidewall. The housing includes valve ports that communicate with the chamber. A diverter assembly is disposed in the chamber and is configured to control fluid flow through the valve housing. The diverter assembly includes a first part including first through openings and a second part that is axially aligned with the first part, the second part including second through openings. The diverter assembly includes an elastic element disposed between the first diverter part and second diverter part, the elastic element biasing the first diverter part toward the lid and the second diverter part toward the base.

20 Claims, 15 Drawing Sheets

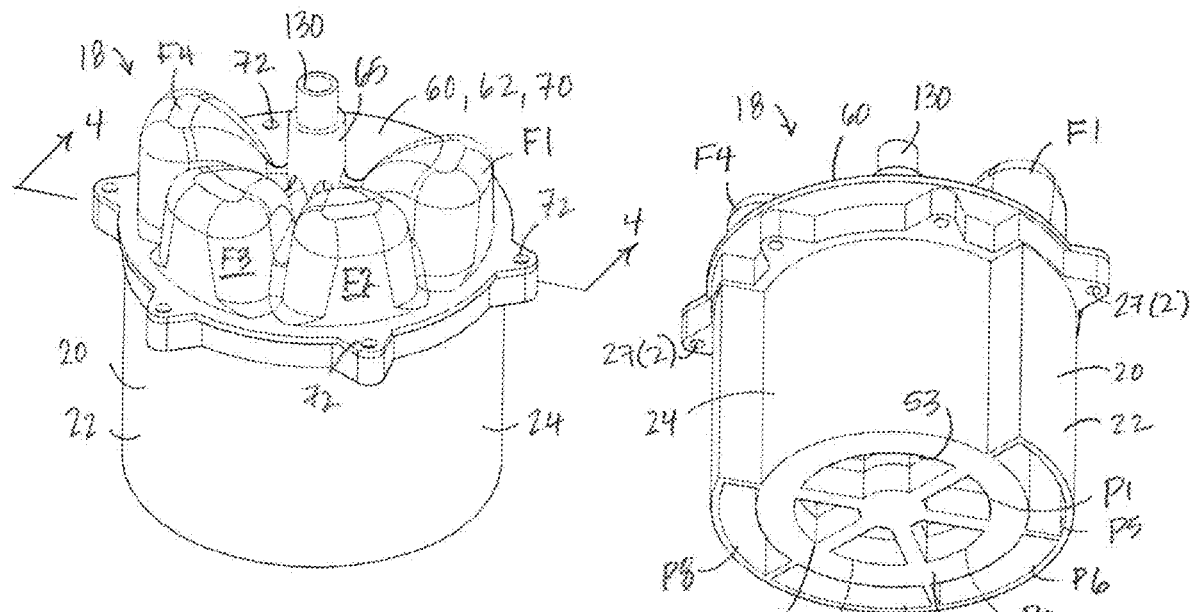
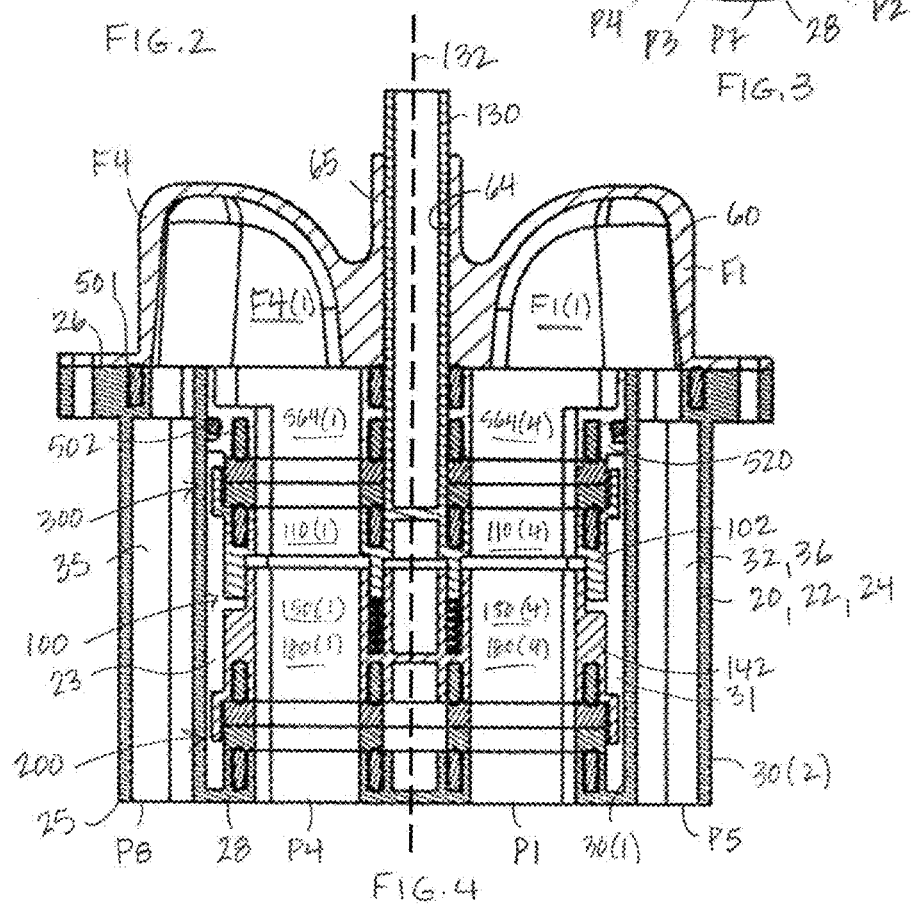

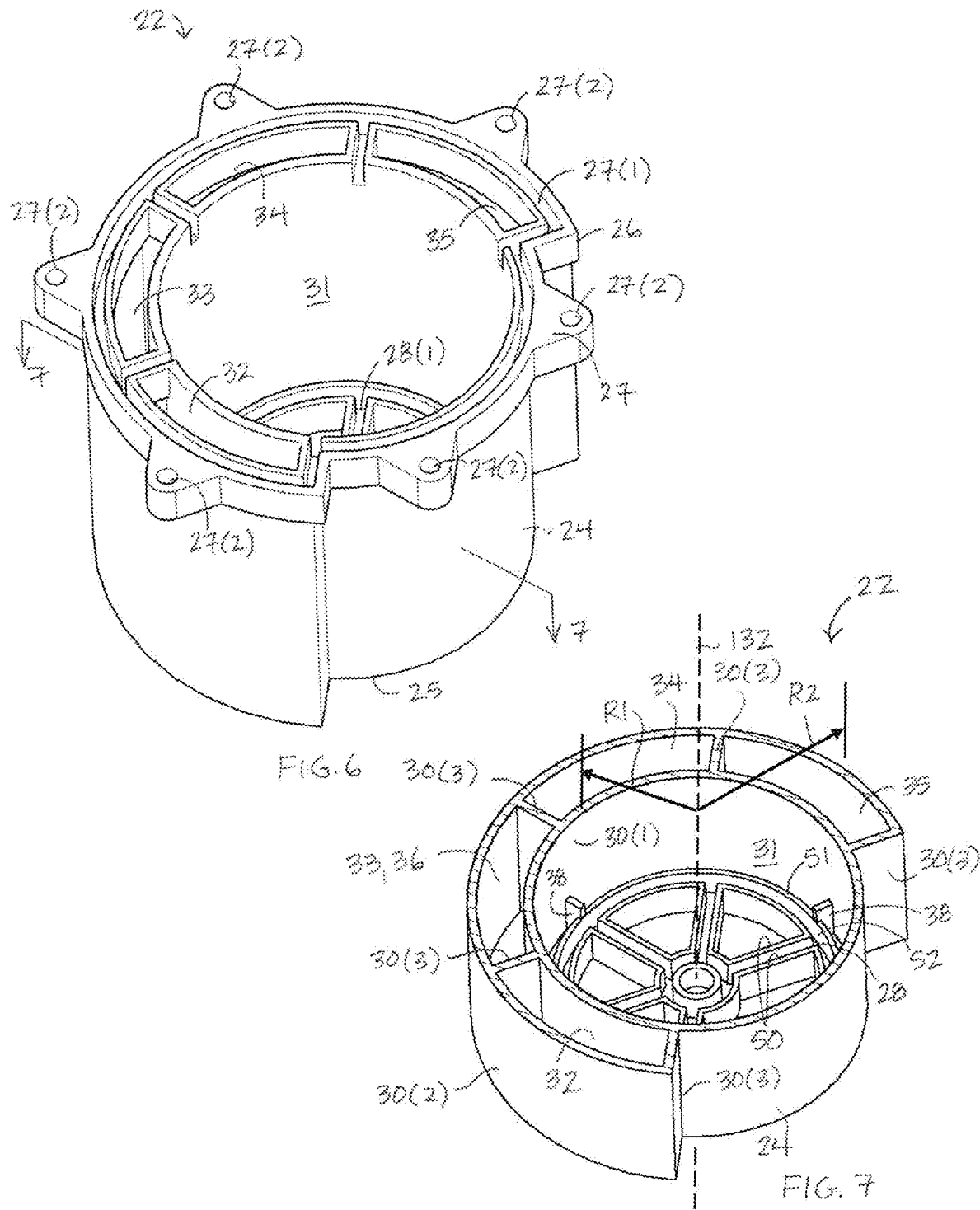

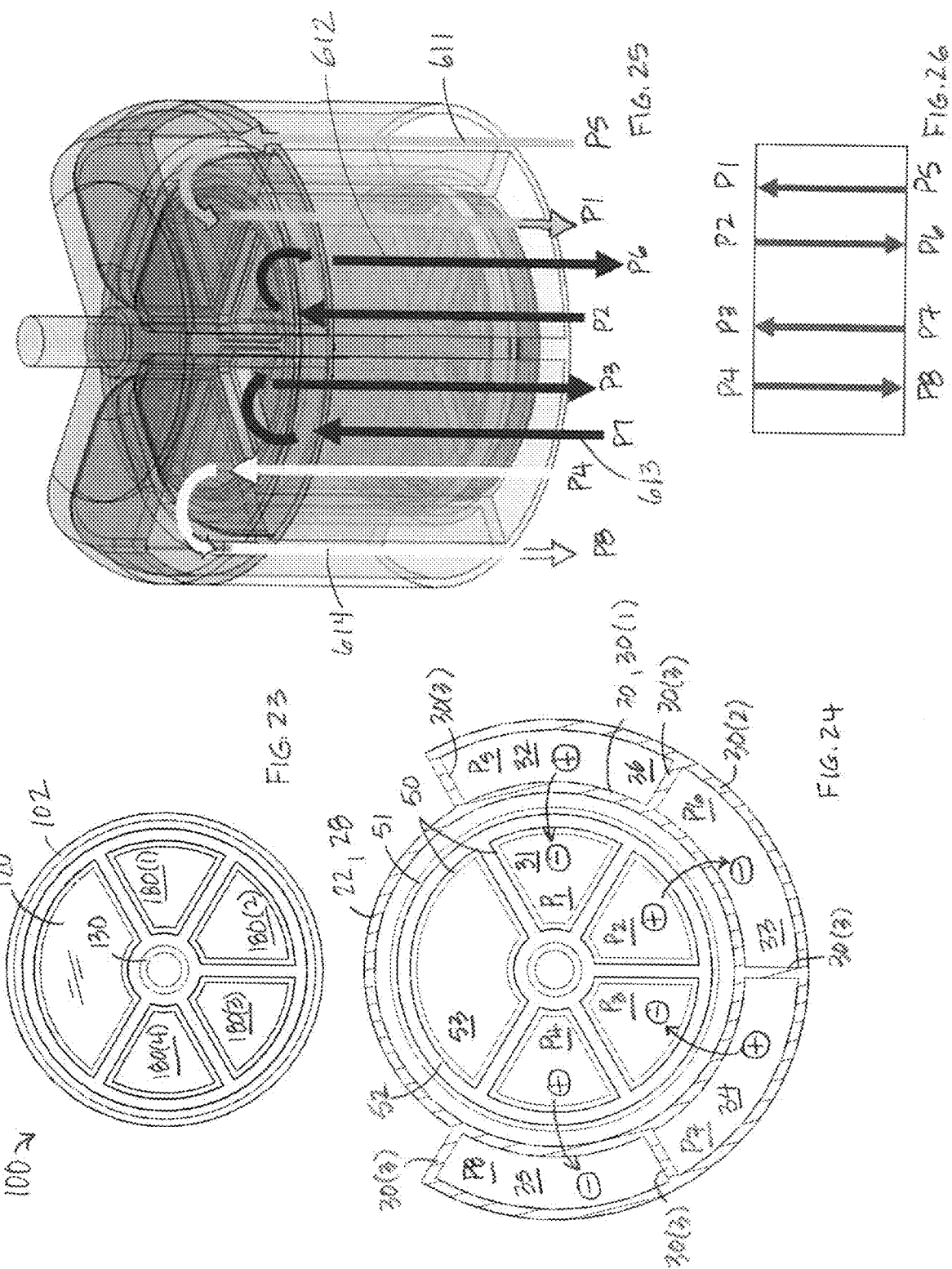

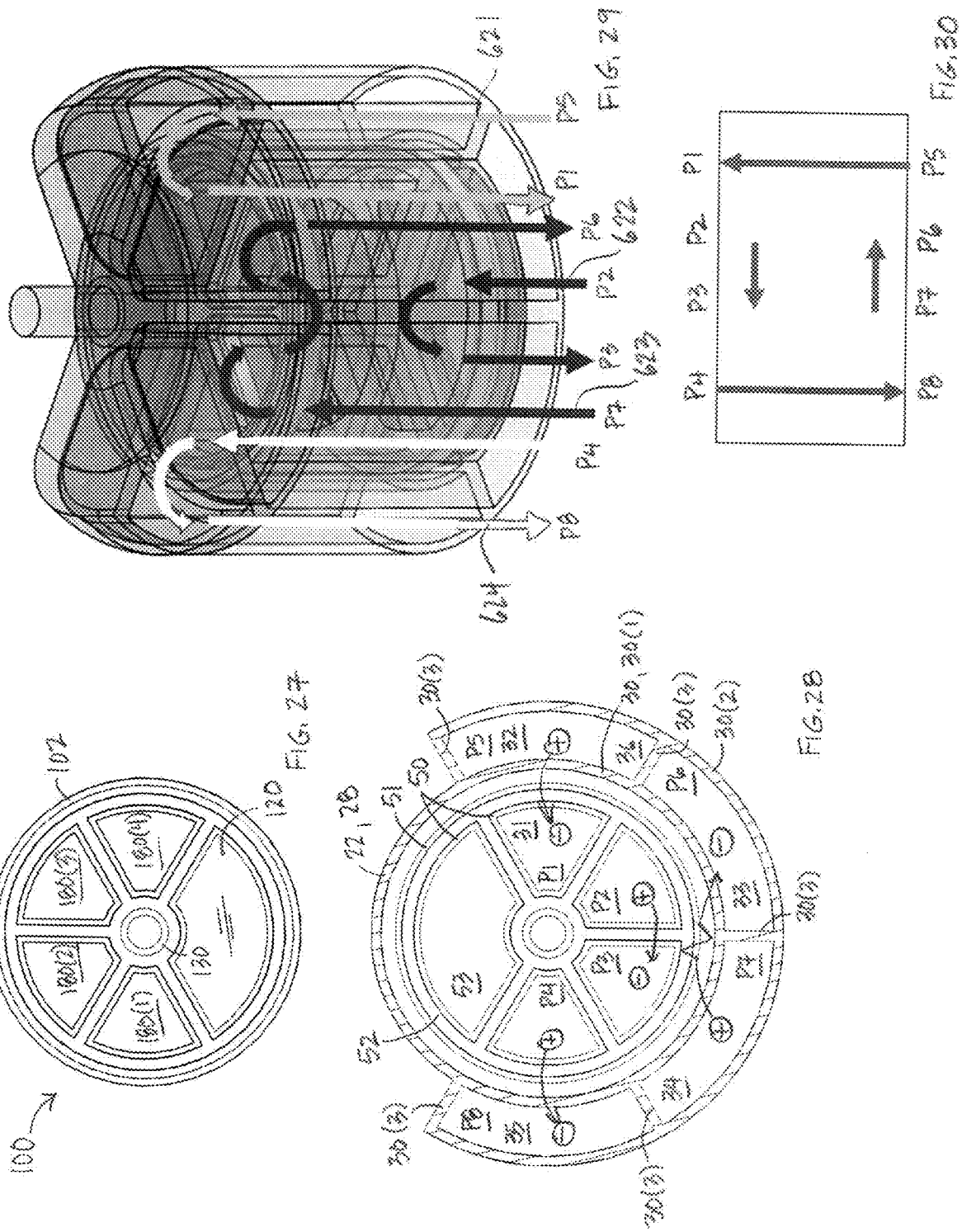

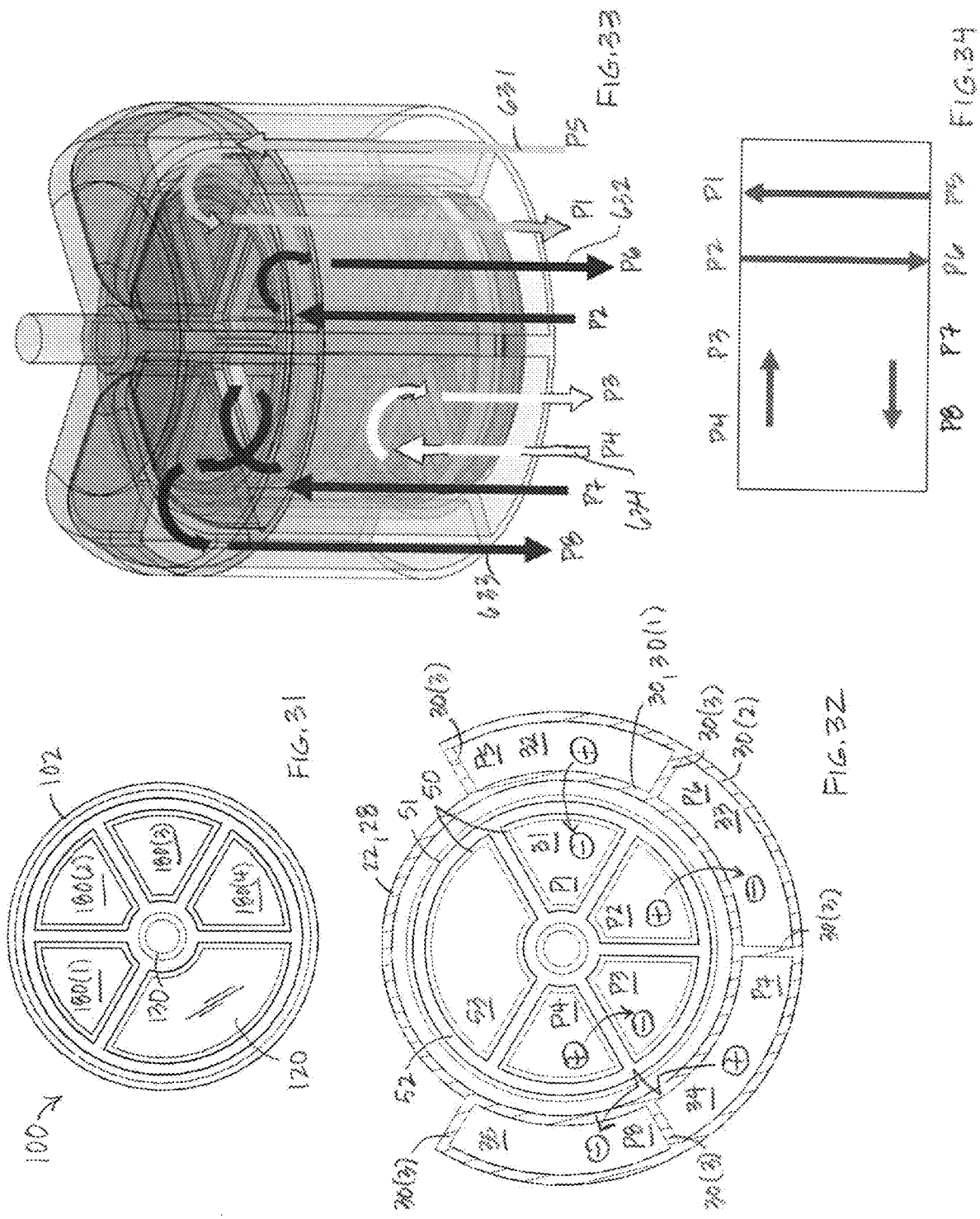

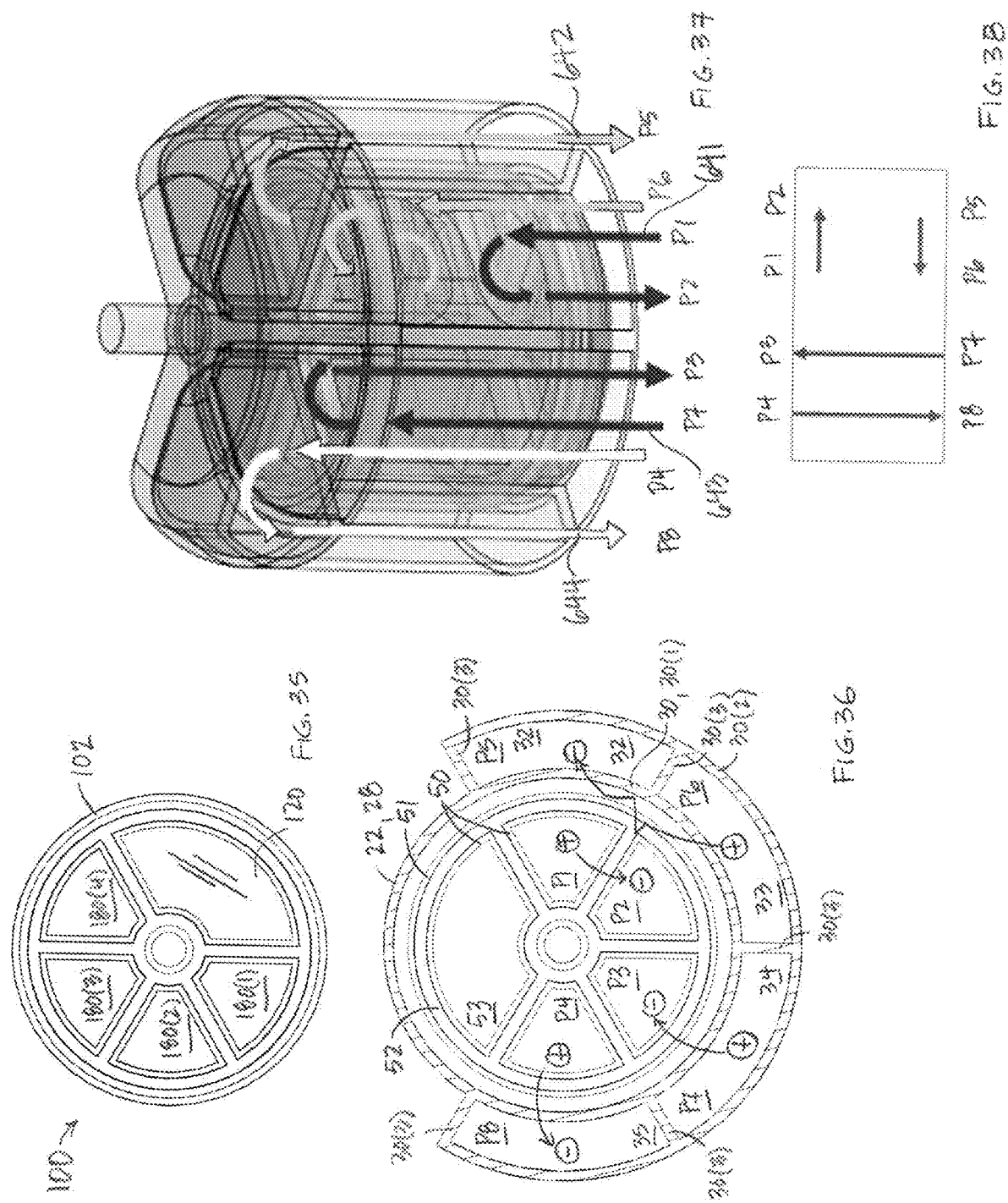

MULTI-PORT ROTARY VALVE

BACKGROUND

Electric vehicles require thermal management of various vehicle components, including electric drive motors, batteries, autonomous driving computers, passenger cabin, etc. The thermal management of the various vehicle components is achieved by efficient use of the thermal energy found within several coolant loops provided within the vehicle. Distribution of the thermal energy is achieved by use of coolant valves and pumps that move automotive coolant to and between the various vehicle components via the coolant loops. The thermal management system of electric vehicles is complex due to the number of vehicle components to be cooled, which in turn requires multiple coolant loops and corresponding multiple sets of pumps and coolant valves. It is desirable to reduce the complexity of vehicle thermal management systems in order to increase efficiency, reduce system costs and improve system reliability.

SUMMARY

A single multi-port rotary disc valve may be used, for example, to distribute automotive coolant through the various coolant loops within a vehicle. The multi-port nature of the rotary disc valve allows a single valve-and-actuator assembly to perform the switching of multiple coolant streams, typically the job of more than one valve. The term "multi-port valve" as used herein refers to a valve that has more than 5 ports, and that controls the flow through more than two coolant paths. The term "rotary disc valve" as used herein refers to a valve in which fluid-tight sealing is provided between planar surfaces of adjacent discs.

Unlike some conventional multi-port valves, the multi-port rotary disc valve described herein utilizes flat discs referred to as "seal plates" as the sealing elements. The term "rotary disc valve" as used herein refers to a valve in which fluid-tight sealing is provided between planar surfaces of adjacent seal plates.

Seal assemblies that employ seal plates require few highly toleranced parts to achieve the required sealing function. This disc design configuration also requires less torque to turn, allowing the use of a smaller actuator that uses less energy. The material used for the discs (e.g., the seal plates) can be changed depending on the required valve lifetime and the amount of abrasive media within the coolant streams.

In some aspects, a valve includes a valve housing. The valve housing includes a sidewall having an open first end and an open second end that is opposite the first end. The valve housing includes a detachable lid that closes the first end of the sidewall. The valve housing includes a base that is disposed at the second end of the sidewall and is perpendicular to the sidewall. The base, the lid and the sidewall cooperate to define a chamber. The valve housing includes valve ports, each valve port communicating with the chamber. The valve includes a diverter assembly that is disposed in the chamber. The diverter assembly is configured to control fluid flow through the valve housing. The diverter assembly includes a shaft that extends through an opening in the valve housing. The shaft is rotatable about a rotational axis that is parallel to the sidewall. The diverter assembly includes a first diverter part including the shaft and first diverter part through openings and a second diverter part that is axially aligned with the first diverter part. The second diverter part includes second diverter part through openings. The diverter assembly also includes an elastic element that is disposed between the first diverter part and second diverter part. The elastic element biases the first diverter part toward the lid and the second diverter part toward the base.

In some embodiments, the first diverter part is mechanically engaged with the second diverter part whereby the first and second diverter parts rotate in concert.

In some embodiments, each second diverter part through opening is axially aligned with a corresponding one of the first diverter part through openings. Each second diverter part through opening is surrounded by a protruding partitioning wall. In addition, the partitioning wall of each second diverter part through opening extends into the corresponding one of the first diverter part through openings, whereby the second diverter part is rotationally fixed relative to the first diverter part.

In some embodiments, a first seal assembly is disposed in the chamber between the diverter assembly and the base; and a second seal assembly is disposed in the chamber between the diverter assembly and the lid. By this configuration, the diverter assembly is disposed between, and axially aligned with, the first seal assembly and the second seal assembly.

In some embodiments, the diverter assembly biases the first seal assembly toward the base and the diverter assembly biases the second seal assembly toward the lid.

In some embodiments, a carrier is disposed in the chamber between the first seal assembly and the lid, and an elastomeric seal is disposed between the carrier and the lid. The diverter assembly compresses the elastomeric seal between the carrier and the lid.

In some embodiments, an annular seal surrounds a periphery of the carrier, the annular seal providing a fluid tight seal between the periphery of the carrier and an inner surface of the valve housing.

In some embodiments, the carrier is fixed relative to the housing.

In some embodiments, the carrier includes carrier through holes, and in predetermined rotational orientations of the diverter assembly relative to the housing, at least one carrier through hole is axially aligned with at least one first diverter part through opening.

In some embodiments, the lid includes an inner surface that faces the chamber, an outer surface that is opposite the inner surface and formations that form domes that protrude from the lid outer surface. One of the domes overlaps at least one first diverter part through opening when the lid is viewed in a direction parallel to the rotational axis.

In some embodiments, the valve housing includes chamber walls that segregate the chamber into subchambers that each provide a portion of a fluid path through the valve housing. At least one valve port communicates with each subchamber. The subchambers comprise a cylindrical first subchamber that is centered on the rotational axis, and a second subchamber that is segregated from the first subchamber. The diverter assembly is disposed in the first subchamber. In addition, at least one lid formation is configured to be aligned, when viewed in a direction parallel to the rotational axis, with both a portion of the first subchamber and a portion of the second subchamber. As a result, the lid formation provides fluid communication between the first subchamber and the second subchamber.

In some embodiments, the subchambers comprise a third subchamber that is segregated from both the first subchamber and the second subchamber. The second subchamber and the third subchamber are disposed radially outward relative to the first subchamber. The lid includes a first lid formation and a second lid formation. The first lid formation provides fluid communication between the first subchamber and the second subchamber, and the second lid formation provides fluid communication between the first subchamber and the third subchamber.

In some embodiments, a first seal assembly is disposed in the chamber between the diverter assembly and the base and a second seal assembly is disposed in the chamber between the diverter assembly and the lid. The diverter assembly is disposed between, and axially aligned with, the first seal assembly and the second seal assembly. In addition, chamber walls segregate the chamber into subchambers that each provide a portion of a fluid path through the valve housing. At least one valve port communicates with each subchamber. The subchambers include a cylindrical first subchamber that is centered on the rotational axis. In addition, a second subchamber is disposed radially outward with respect to the first subchamber. The diverter assembly, the first seal assembly and the second seal assembly are disposed in the first subchamber and each have a circular profile when viewed in a direction parallel to the rotational axis. The diverter assembly has a first diameter, the first seal assembly and the second seal assembly each have a second diameter, and the first diameter and the second diameter are dimensioned to provide a sliding fit with respect to an inner surface of the first subchamber.

In some embodiments, an inner diameter of the second subchamber is greater than the first diameter and the second diameter.

In some embodiments, the second subchamber is free of a flow diverting structure.

In some embodiments, the first diverter part includes a first diverter part base-facing surface and a first diverter part lid-facing surface that is opposite to the first diverter part base-facing surface. The first diverter part includes a first diverter part peripheral surface that surrounds the first diverter part base-facing surface and the first diverter part lid-facing surface. The first diverter part includes first diverter part through openings that extend between the first diverter part base-facing surface and the first diverter part lid-facing surface. In addition, the first diverter part includes the shaft, the shaft protruding from the first diverter part lid-facing surface in a direction substantially perpendicular to the first diverter part lid-facing surface.

In some embodiments, a first seal assembly is disposed in the chamber between the diverter assembly and the base. The first seal assembly includes a first seal subassembly disposed between the diverter assembly and the base. The first seal subassembly is fixed relative to the base. The first seal subassembly includes first through openings, each first through opening being axially aligned with a respective valve port. In addition, the first seal assembly includes a second seal subassembly is disposed between the first seal subassembly and the diverter assembly. The second seal subassembly is fixed relative to the diverter assembly. The second seal subassembly includes second through openings that are axially aligned with the first diverter part through openings.

In some embodiments, a first static, fluid-tight seal is disposed between the first seal subassembly and the base, a second static, fluid-tight seal is disposed between the second seal subassembly and the diverter assembly, and a first dynamic, fluid-tight seal is disposed between the first seal subassembly and the second seal subassembly.

In some embodiments, the valve comprises a second seal assembly that is disposed in the chamber between the diverter assembly and the lid. The second seal assembly includes a third seal subassembly disposed between the diverter assembly and the lid. The third seal subassembly is fixed relative to the diverter assembly. The third seal subassembly includes third through openings that are axially aligned with the first diverter part through openings. The second seal assembly includes a fourth seal subassembly disposed between the first seal subassembly and the lid. The fourth seal subassembly is fixed relative to the lid. The fourth seal subassembly includes fourth through openings that are axially aligned with recesses of the lid.

In some embodiments, a third static, fluid-tight seal is disposed between the third seal subassembly and the diverter assembly, a fourth static, fluid-tight seal is disposed between the fourth seal subassembly and the lid, and a second dynamic, fluid-tight seal is disposed between the third seal subassembly and the fourth seal subassembly.

BRIEF DESCRIPTION OF THE DRAWINGS

FIG. 2 is a top perspective view of the rotary disc valve.

FIG. 3 is a bottom perspective view of the rotary disc valve.

FIG. 4 is a cross-sectional view of the rotary disc valve as seen along line 4-4 of FIG. 2.

FIG. 6 is a top perspective view of the valve body.

FIG. 7 is a cross-sectional view of the valve body as seen along line 7-7 of FIG. 6.

FIGS. 23-26 illustrate a first switching state of the rotary disc valve, where FIG. 23 represents a first rotational orientation of the diverter assembly relative to the valve body, which is illustrated in FIG. 24 and where FIGS. 25 and 26 illustrate flow paths relative to respective ports of the valve housing. In FIG. 24, the symbol "+" represents a fluid flow direction out of the page, and the symbol "−" represents a fluid flow direction into the page.

FIGS. 27-30 illustrate a second switching state of the rotary disc valve, where FIG. 27 represents a second rotational orientation of the diverter assembly relative to the valve body, which is illustrated in FIG. 28 and where FIGS. 29 and 30 illustrate flow paths relative to respective ports of the valve housing. In FIG. 28, the symbol "+" represents a fluid flow direction out of the page, and the symbol "−" represents a fluid flow direction into the page.

FIGS. 31-34 illustrate a third switching state of the rotary disc valve, where FIG. 31 represents a third rotational orientation of the diverter assembly relative to the valve body, which is illustrated in FIG. 32 and where FIGS. 33 and 34 illustrate flow paths relative to respective ports of the valve housing. In FIG. 32, the symbol "+" represents a fluid flow direction out of the page, and the symbol "−" represents a fluid flow direction into the page.

FIGS. 35-38 illustrate a fourth switching state of the rotary disc valve, where FIG. 23 represents a fourth rotational orientation of the diverter assembly relative to the valve body, which is illustrated in FIG. 36 and where FIGS. 37 and 38 illustrate flow paths relative to respective ports of the valve housing. In FIG. 36, the symbol "+" represents a fluid flow direction out of the page, and the symbol "−" represents a fluid flow direction into the page.

DETAILED DESCRIPTION

Figure 1:
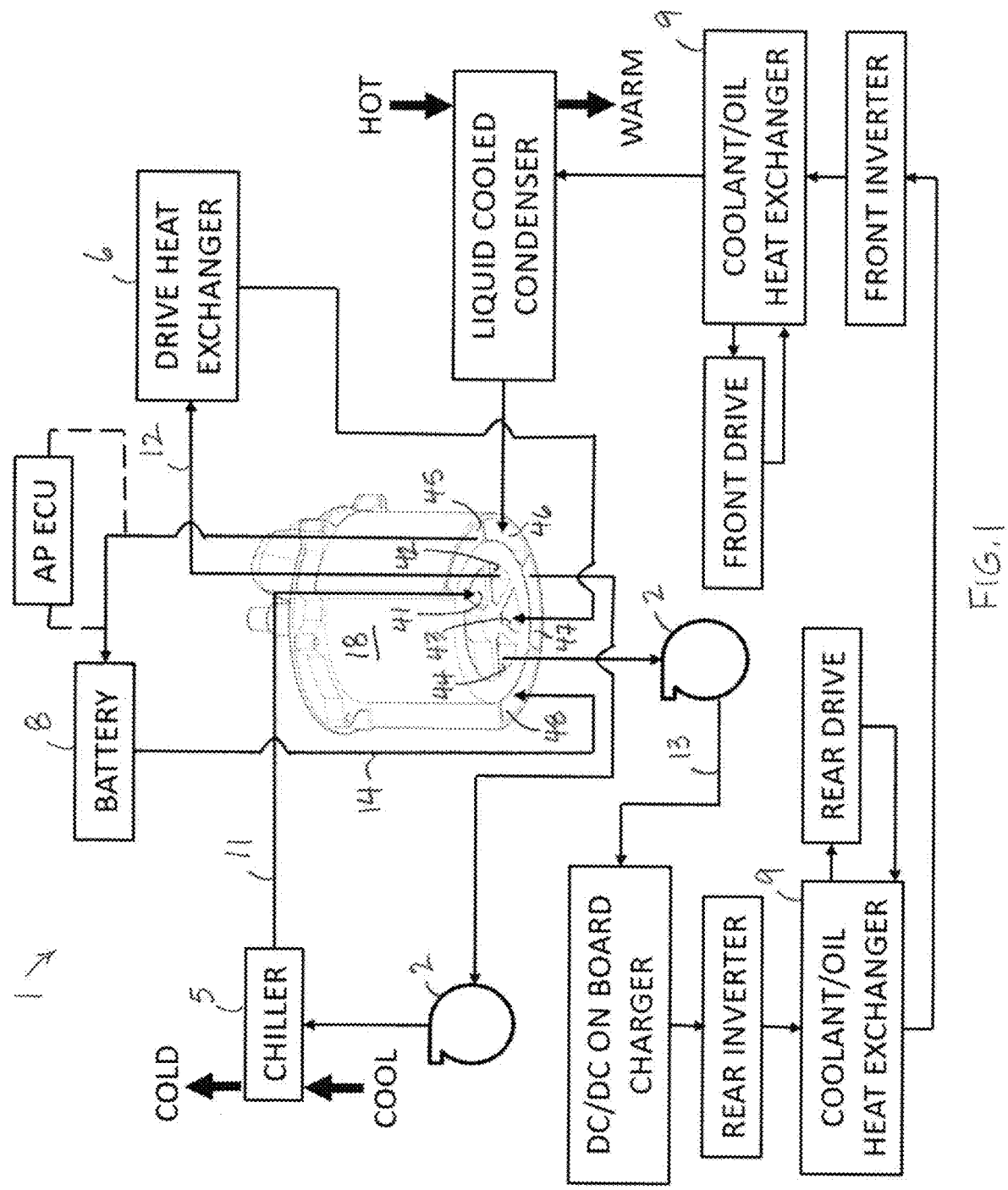
FIG. 1 is a schematic diagram of a fluid delivery system including a multiport rotary disc valve.

Referring to FIGS. 1-4, a fluid delivery system 1 includes a multi-port rotary disc valve 18 that is capable of controlling fluid flow driven by pumps 2 between two, three, four or more individual fluid lines 11, 12, 13, 14 within the system 1. For example, the rotary disc valve 18 may be used to control the distribution and flow of coolant in a cooling system 1 of an electric vehicle having four coolant circuits. In this example, the rotary disc valve 18 may control flow of coolant fluid via a first fluid line 11 between the rotary disc valve 18 and a chiller 5 that is also part of a refrigeration circuit. The rotary disc valve 18 may control flow of coolant fluid via a second fluid line 12 between the rotary disc valve 18 and a radiator 6 that may be associated with a cooling fan. The rotary disc valve 18 may control flow of coolant fluid via a third fluid line 13 between the rotary disc valve 18 and one or more heat exchangers 9 that support temperature control of other vehicle devices and systems, such as electric drive motors, vehicle electronics and/or electronic control units and/or the oil supply. In addition, the rotary disc valve 18 may control fluid flow via a fourth fluid line 14 between the rotary disc valve 18 and a battery 8 and battery management system. The rotary disc valve 18 may include a valve housing 20 that defines several ports and a diverter assembly 100 disposed in the valve housing 20. The diverter assembly 100 is shaped to distribute the flow to predetermined ports for certain rotational orientations of the diverter assembly 100 within the valve housing 20 and is rotated relative to the valve housing 20 to control flow through the rotary disc valve 18.

The valve housing 20 is a closed container that includes a valve body 22 and a lid 60 that closes an open end 26 of the valve body 22. The internal vacancy defined between the valve body 22 and the lid 60 is referred to as the valve chamber 23. The valve housing includes eight valve ports P1, P2, P3, P4, P5, P6, P7, P8 that communicate with the valve chamber 23.

The rotary disc valve 18 includes the diverter assembly 100, a first seal assembly 200 and a second seal assembly 300 that are disposed in the valve chamber 23. The first and second seal assemblies 200, 300 each provide a fluid-tight seal between the valve housing 20 and the diverter assembly 100. In addition, the rotary disc valve 18 includes a seal carrier 520 that is disposed in the valve chamber 23 between the second seal assembly 300 and the lid 60.

The diverter assembly 100 includes a valve shaft 130 that protrudes through an opening 64 of the lid 60. The valve shaft 130 is configured to be connected to a valve actuator (not shown). Upon actuation, the valve shaft 130 together with the diverter assembly 100 rotate relative to the valve housing 20 about a rotational axis 132, and the rotational orientation of the diverter assembly 100 relative to the valve housing 20 is set via the valve actuator. The diverter assembly 100 controls fluid flow through the rotary disc valve 18. In particular, the configuration of fluid paths through the rotary disc valve 18 is determined by the rotational orientation of the diverter assembly 100 relative to the valve housing 20, as discussed in detail below.

Details of the rotary disc valve 18, including the valve housing 20, the seal carrier 520, the diverter assembly 100, and the first and second seal assemblies 200, 300 will now be described.

Valve Housing

Referring to FIGS. 2-7, the valve housing 20 includes the valve body 22. The valve body 22 includes a body sidewall 24 and a base 28 that closes one end (referred to here as the "first end") 25 of the body sidewall 24. The opposite, second end 26 of the body sidewall 24 is open and faces the lid 60. The body sidewall 24 extends in a direction perpendicular to the base 28, and forms a closed, irregular cross-sectional shape when viewed in a direction parallel to the body sidewall 24. The body sidewall 24 is joined at the first end 25 to a peripheral edge of the base 28, and the body sidewall 24 surrounds the base 28. The body sidewall 24 and the base 28 together form a generally cup-shaped structure that opens facing the lid 60.

The valve body 22 has a low profile in that the height of the body sidewall 24 is less than a maximum diameter of the body sidewall 24. However, the valve housing 20, which also includes the lid 60, has a height that is slightly greater than the diameter of the body sidewall 24.

The body sidewall 24 includes chamber walls 30 that extend between the body sidewall first and second ends 25, 26 and partition the valve chamber 23 into five subchambers 31, 32, 33, 34, 35. The chamber walls 30 include a cylindrical inner chamber wall 30(1), and inner surface of which defines the cylindrical first subchamber 31 that is centered on the rotational axis 132. The first subchamber 31 has a circular profile when viewed in a direction parallel to the rotational axis 132 and a radius R1. The chamber walls 30 include an arcuate outer chamber wall 30(2) that surrounds a portion of the inner chamber wall 30(1), whereby a gap 36 exists between the inner and outer chamber walls 30(1), 30(2). When viewed in a direction parallel to the rotational axis 132, the outer chamber wall 30(2) has an arc length of about 240 degrees and a radius R2 that is greater than the radius R1 of the first subchamber 31. In addition, the chamber walls 30 include five linear wall portions 30(3) that extend radially between the inner chamber wall 30(1) and the outer chamber wall 30(2) and segregate the gap 36 into four peripheral subchambers, referred to as the second subchamber 32, the third subchamber 33, the fourth subchamber 34, and the fifth subchamber 35. By this configuration, when viewed in a direction parallel to the rotational axis 132, each of the second, third, fourth and fifth subchambers 32, 33, 34, 35 has a profile in the shape of a sector of an annulus. In the illustrated embodiment, each of the second, third, fourth and fifth subchambers 32, 33, 34, 35 has an arc length of about 60 degrees. It is understood, however, that the shape and size of the second, third, fourth and fifth subchambers 32, 33, 34, 35 depends on the requirements of the specific application, and thus may have a different shape and/or size. Each of the second, third, fourth and fifth subchambers 32, 33, 34, 35 defines an opening at each of the sidewall first and second ends 25, 26. The openings of the second, third, fourth and fifth subchambers 32, 33, 34, 35 at the sidewall second end 26 communicate with respective recesses F1(1), F2(1), F3(1), F4(1) of the lid 60, as discussed below. The openings of the second, third, fourth and fifth subchambers 32, 33, 34, 35 at the sidewall first end 25 serve as respective fifth, sixth, seventh and eighth valve ports P5, P6, P7, P8 as discussed below.

The sidewall 24 includes axially-extending housing ribs 38 that are disposed on an inner surface of the inner chamber wall 30(1) adjacent to the sidewall first end 25. The housing ribs 38 are configured to engage with a seal plate 202 of the first seal assembly 200, as discussed below.

The base 28 of the valve body 22 is disposed at the sidewall first end 25 and is surrounded by the inner chamber wall 30(1). The base 28 includes four through openings that serve as valve ports. In particular, the base 28 includes the first, second, third and fourth valve ports P1, P2, P3, P4 that each communicate with the first subchamber 31. The first, second, third and fourth valve ports P1, P2, P3, P4 each have the shape of a circular sector when viewed in a direction parallel to the rotational axis 132. In the illustrated embodiment, the first, second, third and fourth valve ports P1, P2, P3, P4 are arranged side-by-side about the rotational axis 132, and each of the first, second, third and fourth valve ports P1, P2, P3, P4 has an arc length of about 60 degrees. By this configuration, first, second, third and fourth valve ports P1, P2, P3, P4 are clustered together at one side of the base 28. The portion of the base 28 at the opposite side includes a single through opening 53 having a circular sector shaped profile and a relatively greater arc length. In the illustrated embodiment, the through opening 53 is about 120 degrees. In the illustrated embodiment, the through opening 53 does not serve as a port or fluid passage.

The first valve port P1 is radially aligned with, and disposed radially inward with respect to, the fifth valve port P5. The second valve port P2 is radially aligned with, and disposed radially inward with respect to, the sixth valve port P6. The third valve port P3 is radially aligned with, and disposed radially inward with respect to, the seventh valve port P7. In addition, the fourth valve port P4 is radially aligned with, and disposed radially inward with respect to, the eighth valve port P8.

When the valve body 22 is viewed in a direction parallel to the rotational axis 132, the base 28 has the appearance of a spoked wheel. An inner surface (e.g., a lid-facing surface) 28(1) of the base 28 includes inner protruding ridges 50 that form a border around each of the first, second, third and fourth valve ports P1, P2, P3, P4 as well as the circular sector-shaped large through opening 53 between the first and fourth valve ports P1, P4. The base inner surface 28(1) includes an annular outer protruding ridge 51 that extends about an inner circumference of the inner chamber wall 30(1) and encircles the inner protruding ridges 50. The inner and outer protruding ridges 50, 51 define a base channel 52 that receives and supports a portion 220 of the first seal assembly 200.

The open second end 26 of the body sidewall 24 includes a flange 27. The flange 27 extends around the outer circumference of the body sidewall 24. The flange 27 includes a groove 27(1) that receives a portion of a lid seal 501. One function of the lid seal 501, which is discussed further below, is to provide a fluid tight seal between the flange 27 and a periphery of the lid 60. The flange 27 also includes through openings 27(2) that align with corresponding fastener openings 72 of the lid 60. When the lid 60 is assembled on the valve body 22, fasteners (not shown) received in the respective openings 27(2), 72 secure the lid 60 to the sidewall second end 26.

Referring to FIGS. 2, 4-5 and 8, the valve housing 20 includes the lid 60. The lid 60 is a thin, rigid plate that is shaped and dimensioned to close the open second end 26 of the valve body sidewall 24. The lid 60 includes an inner surface 61 that faces the valve chamber 23, an outer surface 62 that is opposite the inner surface 61 and a peripheral edge 63 that extends between the inner and outer surfaces 61, 62. The lid 60 includes a central opening 64. A lid boss 65 surrounds the central opening 64 and protrudes from the lid outer surface 62. The central opening 64 and an inner surface of the lid boss 65 are dimensioned to receive the diverter shaft 130 in a sliding fit. The diverter shaft 130 extends through the lid boss 65, which serves as a plain bearing for the diverter shaft 130.

The lid 60 includes a first formation 66, a second formation F2, a third formation F3 and a fourth formation F4. Each formation F1, F2, F3, F4, when viewed facing the lid outer surface 62 appears as a dome, and when viewed facing the lid inner surface 61 appears as a recess. The formations F1, F2, F3, F4 are disposed between the lid boss 65 and the lid peripheral edge 63. Each formation F1, F2, F3, F4 has a circular sector-shaped profile when viewed in a direction parallel to the rotational axis 132. The formations F1, F2, F3, F4 are arranged side-by-side about the rotational axis 132, and each has an arc length of about 60 degrees. In addition, each formation F1, F2, F3, F4 is dimensioned and/or positioned so that a radially innermost portion of the respective recess F1(1), F2(1), F3(1), F4(1) is axially aligned (e.g., aligned in a direction parallel to the rotational axis 132) with the first subchamber 31, and so that a radially outermost portion the respective recess F1(1), F2(1), F3(1), F4(1) is axially with the gap 36 between the inner and outer chamber walls 30(1), 30(2). More particularly, the radially innermost portion of each recess F1(1), F2(1), F3(1), F4(1) is positioned at radius R3 that is less than the radius R1 of the inner chamber wall 30(1). In addition, the radially outermost portion of each recess F1(1), F2(1), F3(1), F4(1) has a radial dimension R4 that is greater than the radius R1 of the inner chamber wall 30(1) and is less than the radius R2 of the chamber outer chamber wall 30(2).

The first formation F1 is axially aligned with at least portions of the first valve port P1 and the fifth valve port P5. Thus, for specific rotational orientations of the diverter assembly 100 with respect to the valve housing 20, the recess F1(1) of the first formation F1 diverts fluid between the first subchamber 31 and the second subchamber 32.

The second formation F2 is axially aligned with at least portions of the second valve port P2 and the sixth valve port P6. Thus, for specific rotational orientations of the diverter assembly 100 with respect to the valve housing 20, the recess F2(1) of the second formation F2 diverts fluid between the first subchamber 31 and the third subchamber 33.

The third formation F3 is axially aligned with at least portions of the third valve port P3 and the seventh valve port P7. Thus, for specific rotational orientations of the diverter assembly 100 with respect to the valve housing 20, the recess F3(1) of the third formation F3 diverts fluid between the first subchamber 31 and the fourth subchamber 34.

The fourth formation F4 is axially aligned with at least portions of the fourth valve port P4 and the eighth valve port P8. Thus, for specific rotational orientations of the diverter assembly 100 with respect to the valve housing 20, the recess F4(1) of the fourth formation F4 diverts fluid between the first subchamber 31 and the fifth subchamber 35.

The formations F1, F2, F3, F4 are clustered together at one side of the lid 60, and the portion of the lid 60 at the opposite side is free of formations. This portion of the lid 60 is referred to as the "lid closed portion" 70 and has a circular sector shaped profile. In the illustrated embodiment, the arc length of the lid closed portion 70 is about 120 degrees.

Seal Carrier and Associated Seals

Referring to FIGS. 4 and 10-12, the seal carrier 520 is disposed in the first subchamber 31 of the valve chamber 23 and resides between the second seal assembly 300 and the lid 60. By this configuration, the seal carrier 520 is disposed at the open second end 26 of the body sidewall 24.

The seal carrier 520 is a rigid, low-profile cylindrical structure that includes an annular outer wall 534 that is concentric with the rotational axis 132. The seal carrier 520 includes a thin, planar platform 536 that is perpendicular to the outer wall 534 and segregates the interior space of the seal carrier 520 into a lid-facing portion 539 and a base-facing portion 540. The lid-facing portion 539 is configured to support a lid seal 501 at the open second end 26 of the body sidewall 24, as discussed in detail below. The base-facing portion 540 is configured to support and engage with an elastic element 260 and a seal plate 242 of the second seal assembly 300, as discussed in detail below.

An outer surface 535 of the outer wall 534 faces the inner surface of the inner chamber wall 30(1). The outer wall 534 is dimensioned so that the outer surface 535 is spaced apart from the inner surface of the inner chamber wall 30(1) via a clearance fit. The seal carrier 520 includes a seal groove 538 that extends around the circumference of the outer wall outer surface 535 and receives a carrier seal 502 that provides a fluid-tight seal between the seal carrier 520 and the inner surface of the inner chamber wall 30(1). The carrier seal 502 is discussed in detail below.

The platform 536 includes a carrier central opening 541 that is concentric with the outer wall 534 and concentric with the rotational axis 132. The carrier central opening 541 is shaped and dimensioned to receive the valve shaft 130 therethrough in a clearance fit.

The platform 536 includes carrier peripheral through openings 542 that are disposed between central opening 541 and the outer wall 534. The platform 536 includes four carrier peripheral through openings 542(1), 542(2), 542(3), 542(4). Each carrier peripheral through opening 542(1), 542(2), 542(3), 542(4) has the shape of a circular sector when viewed in a direction parallel to the rotational axis 132. In the illustrated embodiment, the carrier peripheral through openings 542(1), 542(2), 542(3), 542(4) are arranged side-by-side about the rotational axis 132, and each of the carrier peripheral through openings 542(1), 542(2), 542(3), 542(4) has an arc length of about 60 degrees. By this configuration, the carrier peripheral through openings 542(1), 542(2), 542(3), 542(4) are clustered together at one side of the platform 536. The portion of the platform 536 at the opposite side includes a fifth peripheral through opening 542(5) having a circular sector shaped profile and a relatively large arc length. In the illustrated embodiment, the fifth peripheral through opening 542(5) is about 120 degrees. In the illustrated embodiment, the fifth peripheral through opening 542(5) does not serve as a port or fluid passage.

The radial dimension R5 of each of the carrier peripheral through openings 542(1), 542(2), 542(3), 542(4), 542(5) in the lid-facing portion 539 is greater than the radial dimension R6 in the base-facing portion 540, and a lid-facing shoulder 533 is disposed at the transition in radial dimension. The radial dimension R6 corresponds to the radial dimension of the diverter passageways 180 of the diverter assembly 100, which are described below.

The seal carrier 520 includes partitioning walls 545 that protrude from the opposed surfaces 522, 524 of the platform 536. Each of the carrier peripheral through openings 542(1), 542(2), 542(3), 542(4), 542(5) is surrounded by a partitioning wall 545 that has a shape that corresponds to the carrier peripheral through opening 542 that it surrounds. As a result, the partitioning walls 545 have a circular sector-shaped profile when viewed in a direction parallel to the rotational axis 132. Within the lid-facing portion 539, a portion the outer wall 534 provides a portion of the partitioning walls 545. Within the base-facing portion 540, the outer wall 534 surrounds the partitioning walls 545 and is radially spaced apart from the radially-outermost portion of the partitioning walls 545, whereby an annular gap 546 is disposed between the outer wall 534 and the radially-outermost portion of the partitioning walls 545.

The partitioning walls 545 define radially-extending gaps 548 between each pair of adjacent carrier peripheral through openings 542. Within the lid-facing portion 539, since the outer wall 534 provides a portion of each of the partitioning walls 545, slots 544 are formed in the outer wall 534 at locations corresponding to the intersection of the gaps 548 with the outer wall 534. The slots 544 are shaped and dimensioned to receive therethrough the struts 562 of the lid seal 501. By this configuration, the lid seal 501 is rotationally located with respect to, and prevented from relative rotation with respect to, the seal carrier 520.

Within the base-facing portion 540, the radially-extending gaps 548 between each pair of adjacent carrier peripheral through openings 542 intersect with the annular gap 546 to form a carrier channel 530 that receives the elastic element 260 of the second seal assembly 300, as discussed further below. By this configuration, the elastic element 260 is rotationally located with respect to, and prevented from relative rotation with respect to, the seal carrier 520.

The outer wall 534 includes axially-extending carrier ribs 532. The carrier ribs 532 protrude from a base-facing surface of the outer wall 534. The carrier ribs 38 are configured to engage with a seal plate 242 of the second seal assembly 300, as discussed below.

Referring to FIGS. 4-5, 9 and 13-15, the lid seal 501 provides a fluid-tight seal between the lid 60 and the valve body open second end 26. The lid seal 501 includes an arcuate lid seal outer portion 560, an annular lid seal inner portion 561, and the lid seal struts 562 that extend radially between the lid seal outer portion 560 and the lid seal inner portion 561. The lid seal outer portion 560 is a closed loop in which a section 560(1) of the loop has an enlarged radius relative to the remaining section 560(2) of the loop, and a step-change in radius exists at the transition between the sections 560(1), 560(2) of different radii. The lid seal inner portion 561 is encircled by the lid seal outer portion 560. In addition, the lid seal inner portion 561 defines a central through opening 563 that is centered on the rotational axis 132. The lid seal 501 includes peripheral through openings 564 which are defined between the lid seal outer and inner portions 560, 561 and each pair of adjacent lid seal struts 562.

The number and shape of the peripheral through openings 564 of the lid seal 501 correspond to the number and shape of the peripheral through openings 212, 252 of the seal plates 202, 242 of the seal assemblies 200, 300. Thus, in the illustrated embodiment, the lid seal 501 includes five peripheral through openings 564. For specific rotational orientations of the diverter assembly 100 with respect to the valve housing 20, one or more of the peripheral through openings 564 may serve as a portion of a fluid path. In the illustrated embodiment, the lid seal 501 includes four peripheral through openings 564(1), 564(2), 564(3), 564(4) that serve as a portion of a fluid path. Each of the four peripheral through openings 564(1), 564(2), 564(3), 564(4) have the shape of a circular sector when viewed in a direction parallel to the rotational axis 132 and are arranged side-by-side about the rotational axis 132. Each of the four peripheral through openings 564(1), 564(2), 564(3), 564(4) has an arc length of about 60 degrees. By this configuration, the four peripheral through openings 564(1), 564(2), 564(3), 564(4) that serve as a portion of a fluid path are clustered together at one side of the lid seal 501 corresponding to the enlarged radius section 560(1) of the outer portion 560, and each has a radius that approximately corresponds to the radius R2 of the outer chamber wall 30(2).

The portion of the lid seal 501 opposite the clustered four peripheral through openings 564(1), 564(2), 564(3), 564(4) includes the fifth peripheral through opening 564(5). The fifth peripheral through opening 564(5) has a circular sector shaped profile and has a greater arc length when compared to the first through fourth peripheral through openings 564(1), 564(2), 564(3), 564(4). In the illustrated embodiment, the arc length of the fifth peripheral through opening 565(5) is about 120 degrees. The fifth peripheral through opening 564(5) is partially defined by the relatively smaller radius section 560(2) of the outer portion 560 and has a smaller radial dimension when compared to that of the first through fourth peripheral through openings 564(1), 564(2), 564(3), 564(4). In the illustrated embodiment, the radial dimension of the fifth peripheral through opening 564(5) is greater than the radius R1 of the inner chamber wall 30(1) and less than R2 and less than the radius R2 of the outer chamber wall 30(2).

The lid seal 501 is formed of an elastic material that is compatible with the fluid that flows through the rotary disc valve 18 and meets the requirements for operating temperature and durability. For example, when the rotary disc valve 18 is used to control fluid in a vehicle coolant system, the lid seal 501 is formed of an elastomer that is compatible with automotive coolant, such as ethylene propylene diene monomer (EPDM).

In the illustrated embodiment, the lid seal outer portion 560, the lid seal inner portion 561, and the lid seal struts 562 each have a rectangular shaped cross-section but are not limited to having a cross-section of this shape.

The lid seal 501 is thin in that the axial dimension, or thickness, of the lid seal 501 is much less than the dimension of the lid seal 501 in a direction perpendicular to the axial dimension (e.g., much less than the diameter of the lid seal 501). For example, in the illustrated embodiment, the diameter of the lid seal 501 may be in a range of 10 times the lid seal thickness to 20 times the lid seal thickness. In the illustrated embodiment, the thickness of the lid seal 501 is slightly greater than the thickness of the first seal plate 202.

The lid seal outer portion 560 is disposed in the flange groove 27(1) while the lid seal inner portion 561 and lid seal struts 562 are disposed in the seal carrier lid-facing portion 539. By this configuration and due to the biasing force provided by the diverter assembly 100, the lid seal 501 is supported relative to the lid 60 and valve body 22 in such a way that a fluid tight seal is provided between the lid 60 and the flange and between lid 60 and the seal carrier 520.

Figure 5:
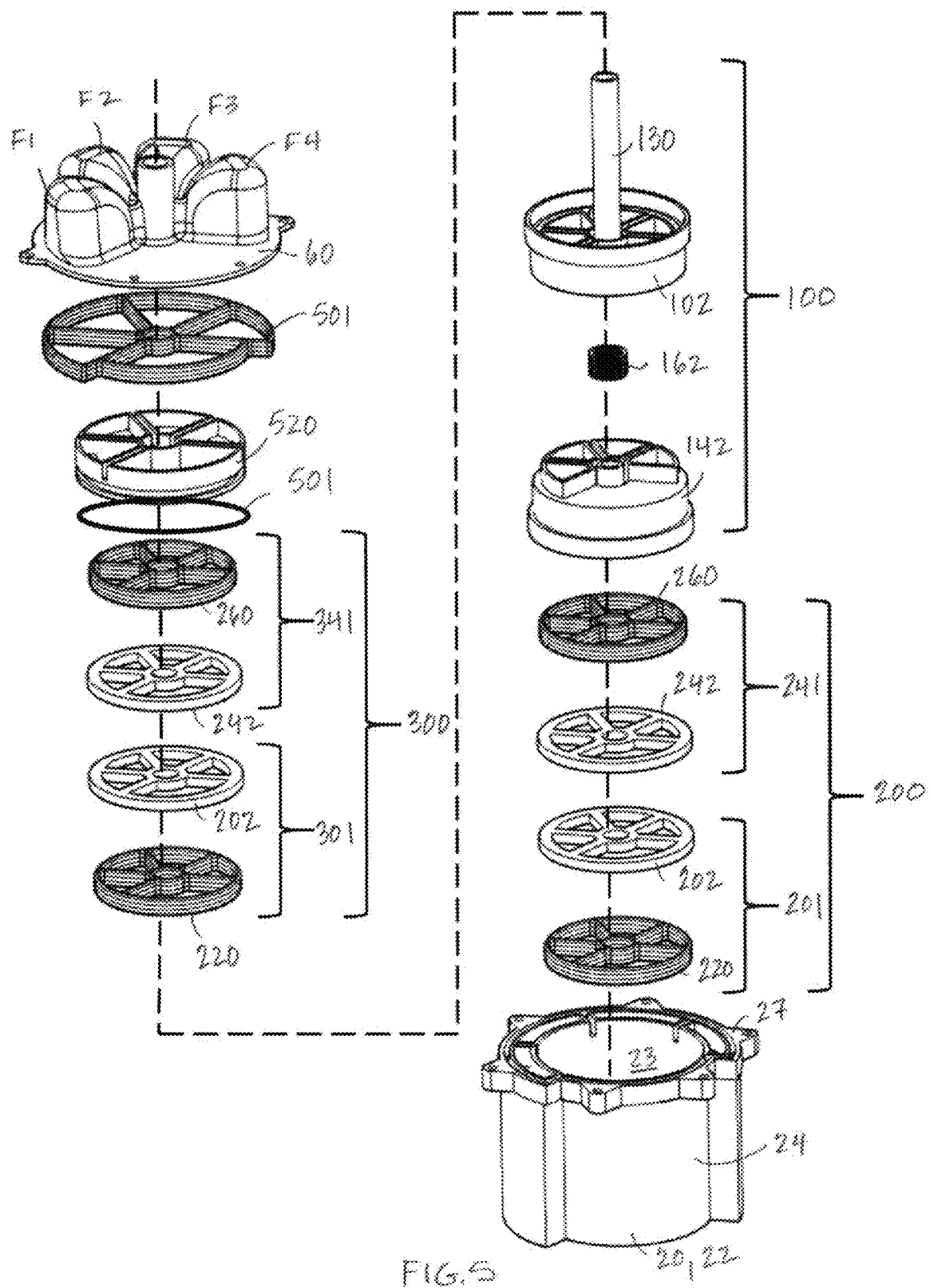
FIG. 5 is an exploded view of the rotary disc valve.
Figure 8:
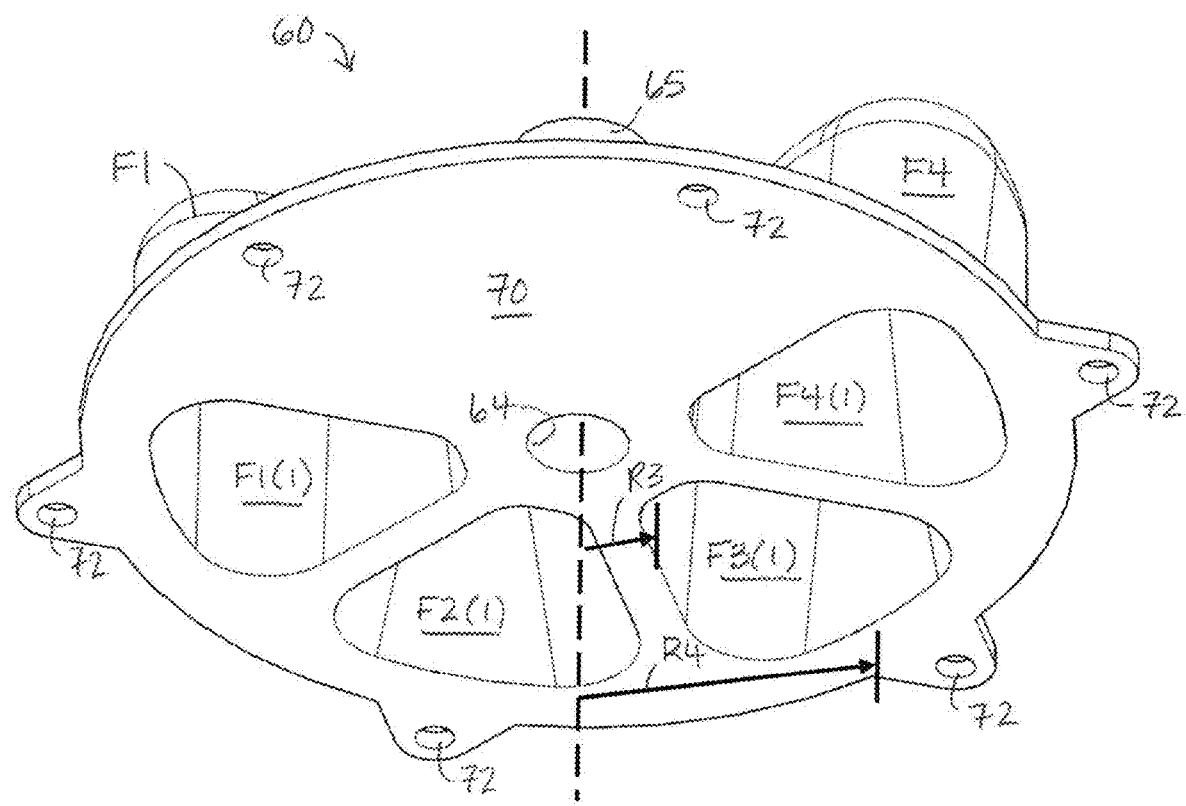
FIG. 8 is a bottom perspective view of the lid.
Figure 9:
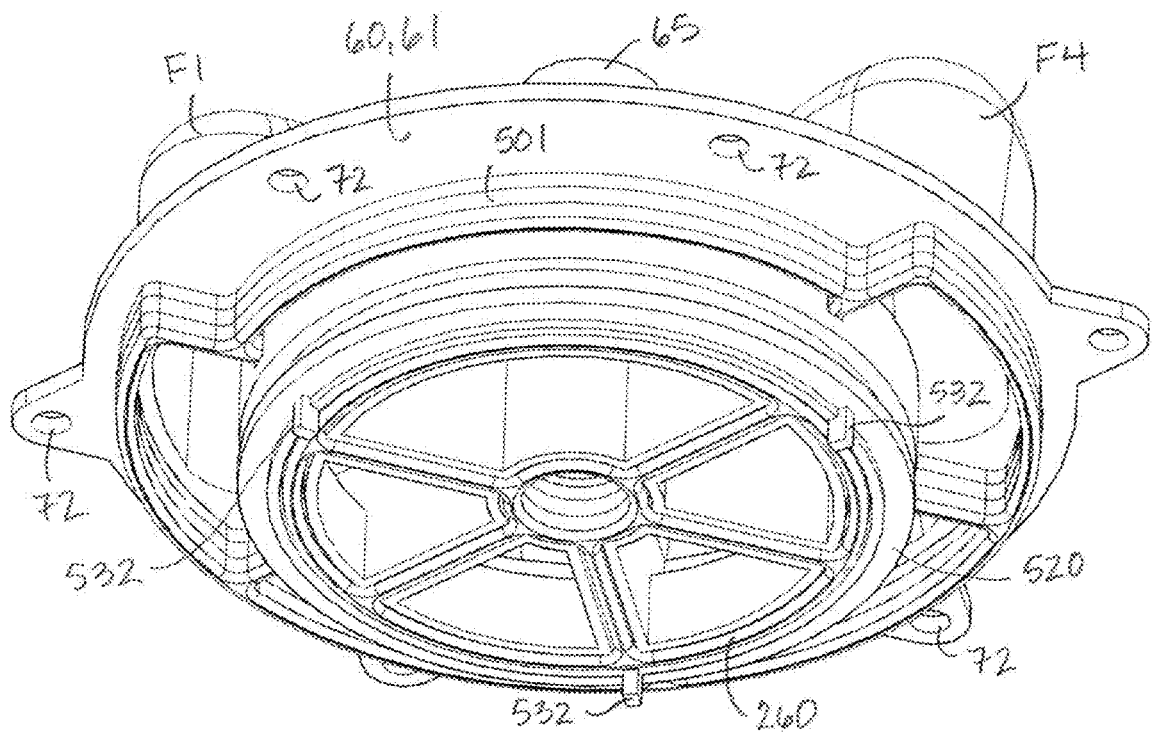
FIG. 9 is a bottom perspective view of the lid, the lid seal, an elastic element of the second seal assembly and the seal carrier in the assembled configuration with the remaining components of the rotary disc valve omitted.
Figure 10:
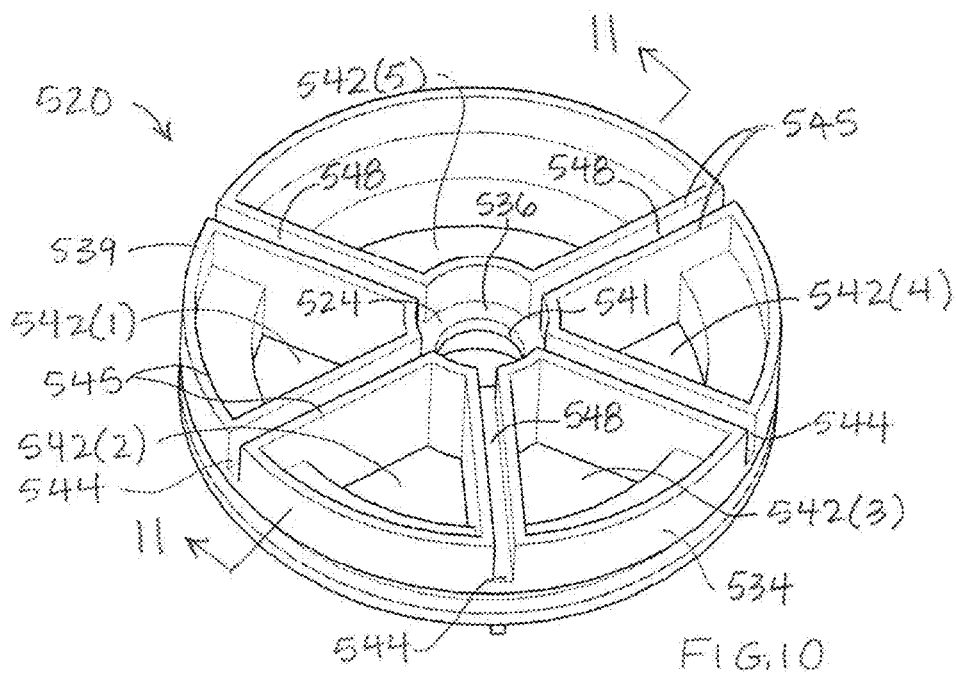
FIG. 10 is a top perspective view of the seal carrier.
Figure 11:
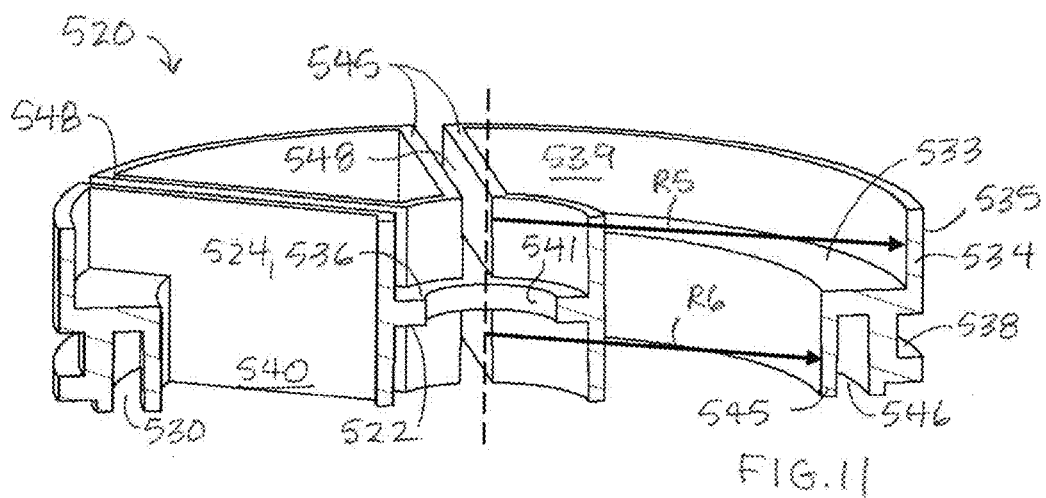
FIG. 11 is a cross-sectional view of the seal carrier as seen along line 11-11 of FIG. 10.
Figure 12:
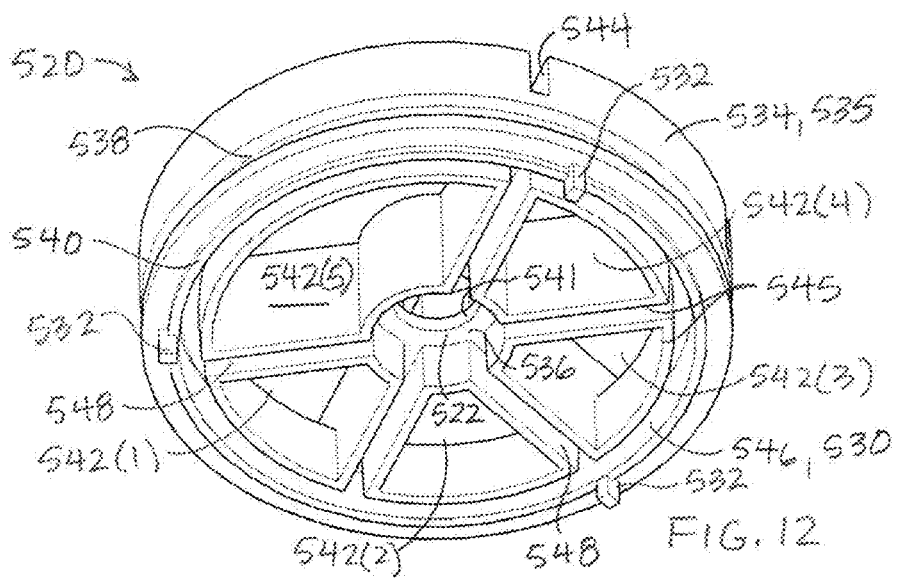
FIG. 12 is a bottom perspective view of the seal carrier.
Figure 13:
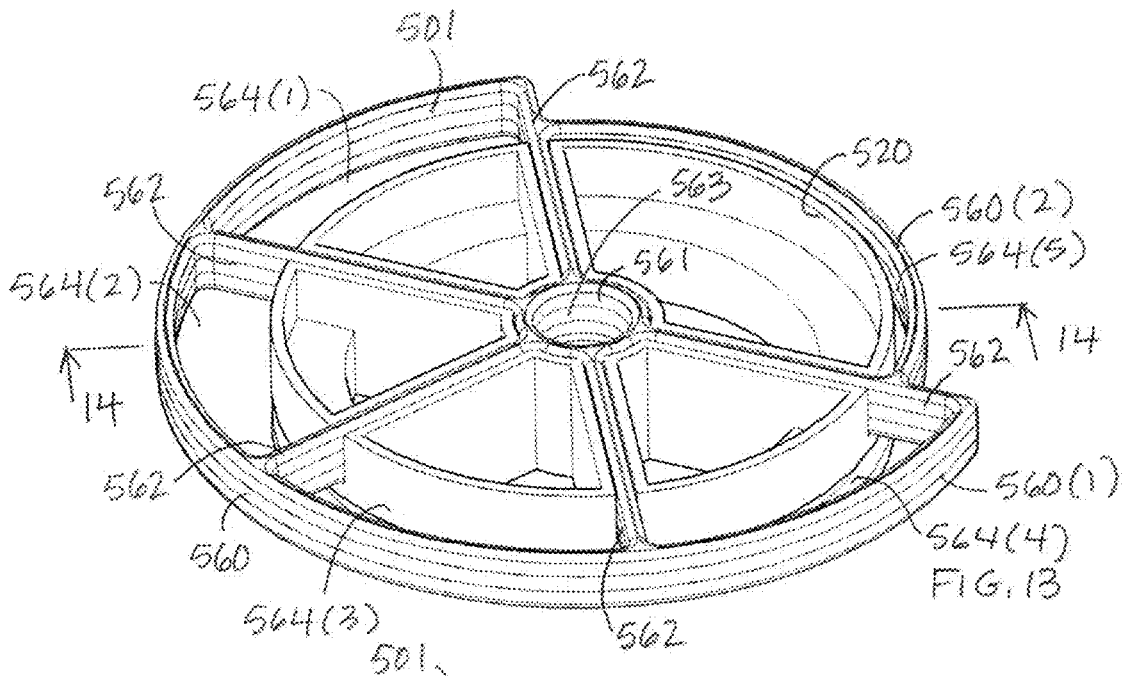
FIG. 13 is a top perspective view of the seal carrier assembled with the lid seal, the carrier seal and an elastic element of the second seal assembly.
Figure 14:
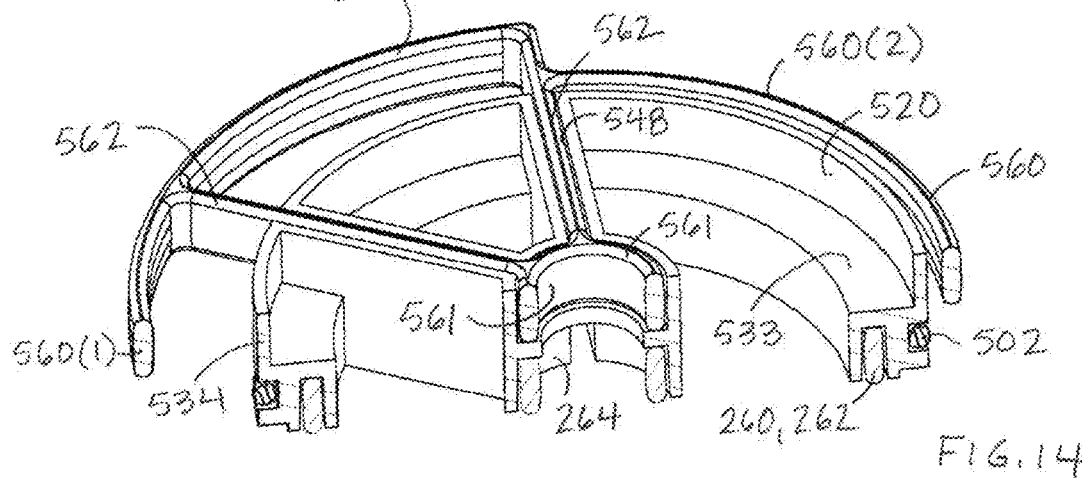
FIG. 14 is a cross-sectional view of the assembly of FIG. 13 as seen along line 14-14 of FIG. 13.
Figure 15:
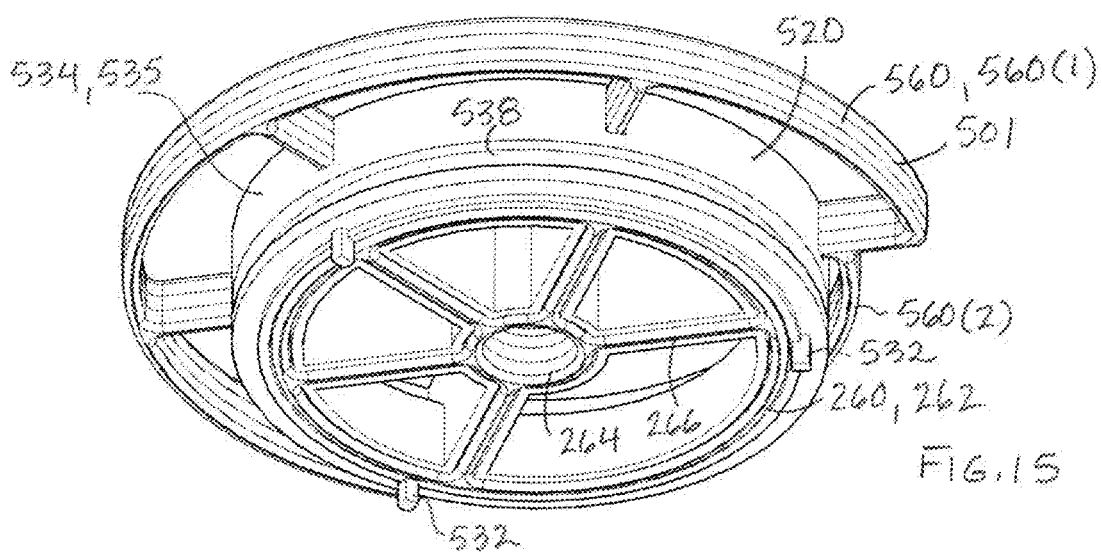
FIG. 15 is a bottom perspective view of the assembly of FIG. 13 with the carrier seal omitted.
Figure 16:
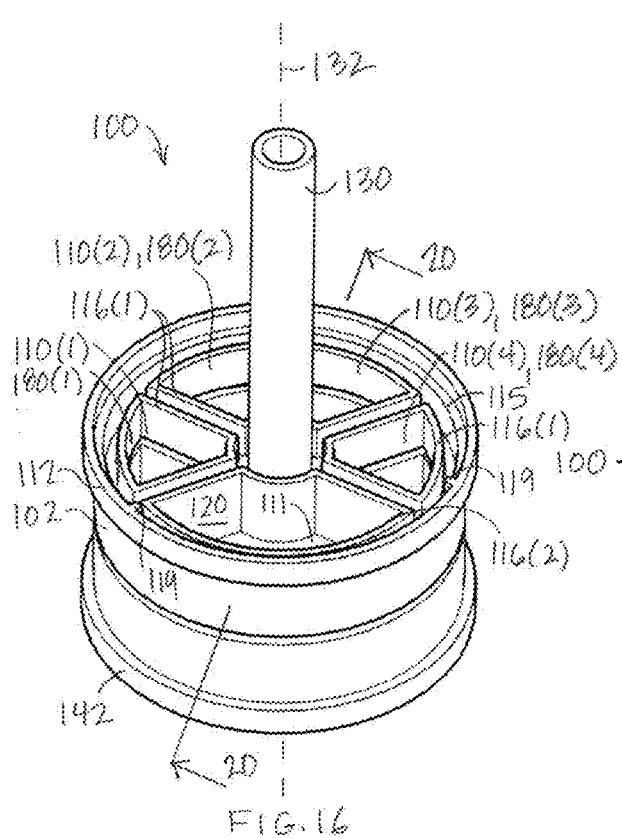
FIG. 16 is a top perspective view of the diverter assembly.

Referring to FIGS. 4-5 and 14, the carrier seal 502 is an elastomeric seal in the shape of an O ring. The carrier seal 502 is formed of an elastic material that is compatible with the fluid that flows through the rotary disc valve 18 and meets the requirements for operating temperature and durability. For example, when the rotary disc valve 18 is used to control fluid in a vehicle coolant system, the carrier seal 502 is formed of an elastomer that is compatible with automotive coolant, such as ethylene propylene diene monomer (EPDM).

Diverter Assembly

Referring to FIGS. 4-5 and 16-19, the diverter assembly 100 controls fluid flow between the respective ports P1, P2, P3, P4, P5, P6, P7, P8 of the valve housing 20. The diverter assembly 100 is disposed in the first subchamber 31 of the valve chamber 23 and is rotatable relative to the valve body 22 about the rotational axis 132. The diverter assembly 100 includes first (or upper) diverter part 102, a second (or lower) diverter part 142 and an elastic member 162 disposed between the first and second diverter parts 102, 142. Each of the first and second diverter parts 102, 142 are generally disc shaped (e.g., are generally cylindrical and have an axial dimension that is much less than its diameter).

The first diverter part 102 includes a flat, circular first diverter part disc 104 that is surrounded by an upstanding first diverter part rim 112, whereby the first diverter part 102 has the appearance of a shallow cup that opens facing the lid 60 of the valve body 22. The first diverter part disc 104 has a base-facing surface 106 and a lid-facing surface 108 that is opposite the base-facing surface 106. An outer surface of the first diverter part rim 112 faces an inner surface of the inner chamber wall 30(1). The first diverter part rim 112 has a step change in diameter between the disc 104 and an open end 114 of the first diverter part rim 112. As a result, the open end 114 of the first diverter part rim 112 has a greater diameter than the first diverter part disc 104, and an internal lid-facing shoulder 115 is provided at the transition between diameters.

The inner surface of the first diverter part rim 112 includes first diverter part ribs 119. The first diverter part ribs 119 are disposed at the rim open end 114 and protrude radially inward. The ribs 119 are spaced apart from each other along an inner circumference of the first diverter part rim 112. The ribs 119 extend axially and are configured to engage with a seal plate 202 of the second seal assembly 300, as discussed further below.

The first diverter part 102 includes a valve shaft 130 that protrudes from the center of the lid-facing surface 108 in a direction perpendicular to the lid-facing surface 108. The valve shaft 130 is concentric with the rotational axis 132 and is configured to be connected to the valve actuator which drives the valve shaft 130 to rotate about the rotational axis 132. For example, the outer surface of the valve shaft 130 may include flats, splines or other features (none shown) that permit engagement with an output structure of the valve actuator.

The first diverter part disc 104 includes a central opening 109 that is axially aligned with the valve shaft 130. In the illustrated embodiment, the valve shaft 130 is hollow, and the first diverter part 102 includes a wall 113 that segregates an interior space of the valve shaft 130 from the central opening 109 whereby the central opening 109 is a blind hole.

The first diverter part disc 104 includes first diverter part through openings 110 that are disposed between central opening 109 and the first diverter part rim 112. The first diverter part disc 104 includes four through openings 110(1), 110(2), 110(3), 110(4). Each first diverter part through opening 110(1), 110(2), 110(3), 110(4) has the shape of a circular sector when viewed in a direction parallel to the rotational axis 132. In the illustrated embodiment, the first diverter part through openings 110(1), 110(2), 110(3), 110(4) are arranged side-by-side about the rotational axis 132, and each of the first diverter part through openings 110(1), 110(2), 110(3), 110(4) has an arc length of about 60 degrees. By this configuration, the first diverter part through openings 110(1), 110(2), 110(3), 110(4) are clustered together at one side of the first diverter part disk 104, and the portion of the first diverter part disk 104 opposite the first diverter part through openings 110(1), 110(2), 110(3), 110(4) is free of through openings. This portion of the first diverter part disk 104 is referred to as the "closed portion" 111 and has a circular sector shaped profile. In the illustrated embodiment, the arc length of the closed portion is about 120 degrees. The closed portion 111, in cooperation with a corresponding closed portion 151 of the second diverter part 142, allows closure of fluid paths through the rotary disc valve 18 in specific rotational orientations of the diverter assembly 100 relative to the valve housing 20.

The first diverter part disc 104 includes first and second partitioning walls 116(1), 116(2) that protrude from the first diverter part lid-facing surface 108. Each first diverter part through opening 110(1), 110(2), 110(3), 110(4) is surrounded by a first partitioning wall 116(1) that has a shape that corresponds to the first diverter part through opening 110(1), 110(2), 110(3), 110(4) that it surrounds. As a result, the first partitioning walls 116(1) have a circular sector-shaped profile when viewed in a direction parallel to the rotational axis 132. A first portion 116(1-1) of each of the first partitioning walls 116(1) adjoins the first diverter part disc 104 and has an inner dimension that corresponds to the dimensions of the first diverter part through opening 110(1), 110(2), 110(3), 110(4) that it surrounds. A second portion 116(1-2) of each of the first partitioning walls 116(1) is spaced apart from the first diverter part disc 104 and has an inner dimension that is slightly less than the dimensions of the first diverter part through opening 110 that it surrounds. Each first partitioning wall 116(1) includes a partition shoulder 116(1-3) at the transition between the first portion 116(1-1) and the second portion 116(1-2) thereof.

The second partitioning wall 116(2) encloses the closed portion 111 of the first diverter part disk 104. By this configuration, the second partitioning wall 116(2) and the closed portion 111 together define a first diverter pocket 120 that opens facing the lid 60.

Each of the first and second partitioning walls 116(1), 116(2) has a height that is the same as that of the small diameter portion of the first diverter part rim 112, where the term "height" refers to the dimension in a direction parallel to the rotational axis 132. The radially innermost portions of each partitioning wall 116(1), 116(2) face the valve shaft 130, are arcuate and are radially spaced apart from the valve shaft 130 a small distance, as can be seen when the first diverter part 102 is viewed in a direction parallel to the rotational axis 132 and facing the lid-facing surface 108. Also seen in this view, the partitioning walls 116(1), 116(2) form a raised pattern that matches the portions of the profile of the facing element (e.g., the first elastic element 220) of the second seal assembly 300. The partitioning walls 116(1), 116(2), together with an inner surface of the first diverter part rim 112 and an outer surface of the valve shaft 130 cooperate to define a first diverter part channel 118 that receives and supports a portion of the first elastic element 220 of the second seal assembly 300, as discussed further below. By this configuration, the first elastic element 220 is rotationally located with respect to, and prevented from relative rotation with respect to, the first diverter part 102.

The second diverter part 142 is axially aligned with the first diverter part 102 and includes a flat, circular second diverter part disc 144. The second diverter part disc 144 is surrounded by a depending second diverter part rim 152, whereby the second diverter part 142 has the appearance of a shallow cup that opens facing the base 28 of the valve body 22. The second diverter part disc 144 has a base-facing surface 146 and a lid-facing surface 148 that is opposite the base-facing surface 146. An outer surface of the second diverter part rim 152 faces an inner surface of the inner chamber wall 30(1). The second diverter part rim 152 has a step change in diameter between the disc 144 and an open end 154 of the second diverter part rim 152. As a result, the open end 154 of the second diverter part rim 152 has a greater diameter than the second diverter part disc 144, and an internal base-facing shoulder 155 is provided at the transition between diameters.

The inner surface of the second diverter part rim 152 includes second diverter part ribs 157. The second diverter part ribs disposed at the rim open end 154 and protrude radially inward. The ribs 157 are spaced apart from each other along an inner circumference of the second diverter part rim 152. The ribs 157 extend axially and are configured to engage with a seal plate 252 of the first seal assembly 200, as discussed further below.

The second diverter part disc 144 includes a central opening 149 that is segregated into opposed, axially-aligned blind openings 149(1), 149(2) by a wall 153 that is parallel to, and offset from, the second diverter part disc 144. As can be seen when the second diverter part 142 is viewed cross section, the second diverter part disc 144 includes a centrally-positioned diverter part boss 143 that protrudes axially from the wall 153 toward both the valve body base 28 and the lid 60 and is centered on the rotational axis 132. The diverter part boss 143 includes a first portion 143(1) that protrudes toward the lid 60 and terminates at an axial location beyond the second diverter part disc lid-facing surface 148. In addition, the diverter part boss 143 includes a second portion 143(2) that protrudes toward the base 28 and terminates at an axial location corresponding to that of the second diverter part rim shoulder 155. A diameter of the diverter part boss 143 is less than a diameter of the central opening 149. As a result, a first annular groove 145(1) exists between an outer surface of the diverter part boss first portion 143(1) and an inner surface of the lid-facing blind opening 149(1), and a second annular groove 145(2) exists between the outer surface of the diverter part boss second portion 143(2) and an inner surface of the base-facing blind opening 149(2). The first annular groove 145(1) receives and supports a portion of the elastic member 162, as discussed further below. The second annular groove 145(2) receives and supports a portion 264 of an elastic element 260 of the first seal assembly 200, as discussed further below.

The second diverter part disc 144 includes second diverter part through openings 150 that are disposed between the second diverter part central opening 149 and the second diverter part rim 152. The shape and number of the second diverter part through openings 150 corresponds to that of the first diverter part 102. Thus, the second diverter part disc 144 includes four through openings 150(1), 150(2), 150(3), 150(4), each second diverter part through opening 150(1), 150(2), 150(3), 150(4) having the shape of a circular sector when viewed in a direction parallel to the rotational axis 132. In the illustrated embodiment, the second diverter part through openings 150(1), 150(2), 150(3), 150(4) are arranged side-by-side about the rotational axis 132, and each of the second diverter part through openings 150(1), 150(2), 150(3), 150(4) has an arc length of about 60 degrees. By this configuration, the second diverter part through openings 150(1), 150(2), 150(3), 150(4) are clustered together at one side of the second diverter part disk 144, and the portion of the second diverter part disk 144 at the opposite side is free of through openings. This portion is referred to as the "closed portion" 151 and has a circular sector shaped profile. In the illustrated embodiment, the arc length of the closed portion is about 120 degrees. The closed portion 151 of the second diverter part 142, in cooperation with the corresponding closed portion 111 of the first diverter part 102, allows closure of fluid paths through the rotary disc valve 18 in specific rotational orientations of the diverter assembly 100 relative to the valve housing 20.

The second diverter part disc 144 includes first and second partitioning walls 156(1), 156(2) that protrude from the second diverter part lid-facing surface 148. Each of the second diverter part through openings 150(1), 150(2), 150 (3), 150(4) is surrounded by a first partitioning wall 156(1) that has a shape that corresponds to the second diverter part through opening 150 that it surrounds. As a result, the first partitioning walls 156(1) have a circular sector-shaped profile when viewed in a direction parallel to the rotational axis 132. A first portion 156(1-1) of each of the first partitioning walls 156(1) protrudes from the second diverter part lid-facing surface 148 and terminates at an axial location corresponding to that of the diverter part boss first portion 143(1). In addition, the first portion 156(1-1) of each of the first partitioning walls 156(1) has an inner dimension that corresponds to the dimensions of the second diverter part through opening 150 that it surrounds. A second portion 156(1-2) of each of the first partitioning walls 156(1) protrudes from the second diverter part base-facing surface 146 and terminates at an axial location corresponding to that of the second diverter part rim shoulder 155. In addition, the second portion 156(1-2) of each of the first partitioning walls 156(1) has an inner dimension has an inner dimension that corresponds to the dimensions of the second diverter part through opening 150 that it surrounds, whereby the transition between the first and second portions 156 (1-1), 156 (1-2) is smooth.

A second partitioning wall 156(2) protrudes from the second diverter part base-facing surface 146 and encloses the second diverter part closed portion 151. The second partitioning wall 156(2) protrudes from the second diverter part base-facing surface 146 and terminates at an axial location corresponding to that of the second diverter part rim shoulder 155. By this configuration, the second partitioning wall 156(2) and the closed portion 151 together define a second diverter pocket 160 that opens facing the valve housing base 28.

The second portion 156(1-2) of each of the first partitioning walls 156(1) and the second partitioning wall 156(2) together with an inner surface of the second diverter part rim 152 form a raised pattern that matches the profile of the facing element (e.g., the second elastic element 260) of the first seal assembly 200. The second portion 156(1-2) of each of the first partitioning walls 156(1) and the second partitioning wall 156(2) together with an inner surface of the second diverter part rim 152 cooperate to define a second diverter part channel 158 that receives and supports a portion of the second elastic element 260 of the first seal assembly 200, as discussed further below. By this configuration, the second elastic element 260 is rotationally located with respect to, and prevented from relative rotation with respect to, the second diverter part 142.

Figure 17:
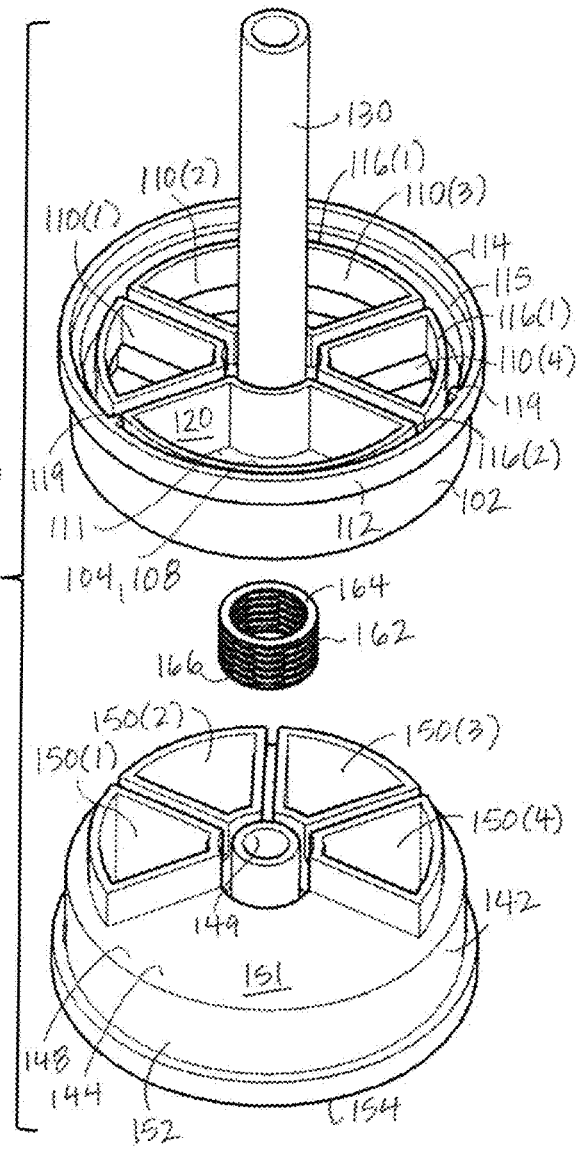
FIG. 17 is an exploded top perspective view of the diverter assembly.
Figure 18:
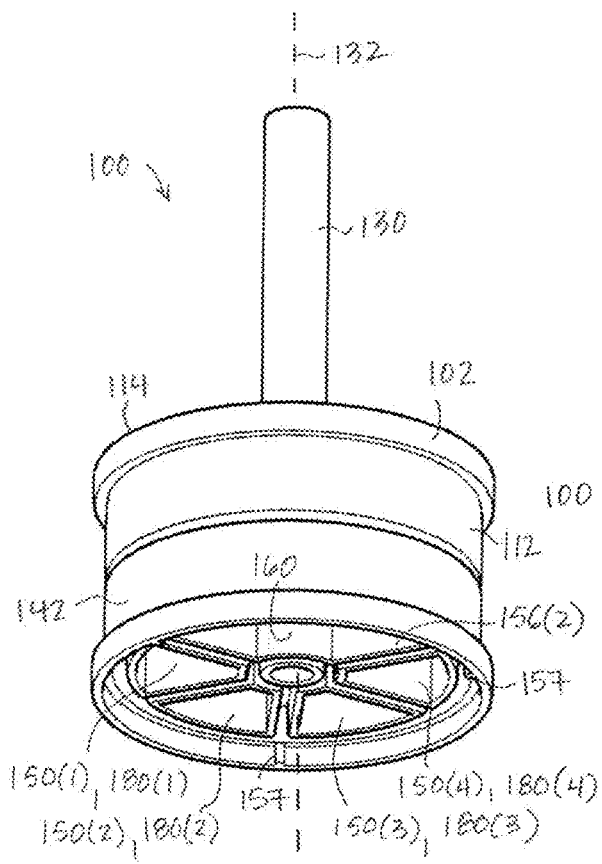
FIG. 18 is a bottom perspective view of the diverter assembly.
Figure 19:
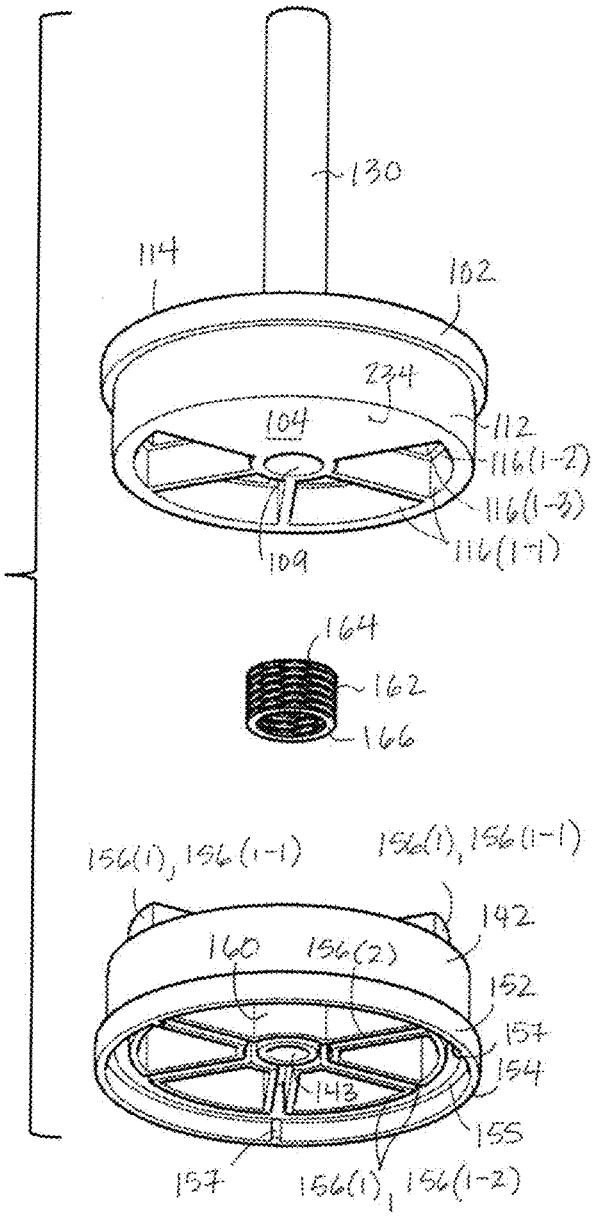
FIG. 19 is an exploded bottom perspective view of the diverter assembly.

Referring to FIGS. 17 and 19, the diverter assembly 100 includes the elastic member 162 that is disposed between the first and second diverter parts 102, 142. Although in the illustrated embodiment, the elastic member 162 is a coil spring, other appropriate elastic devices may be used, including, but not limited to, a wave spring. One end 164 of the spring 162 abuts the first diverter part disc base-facing surface 106, and an opposed end 166 of the spring 162 is received in the second annular groove 145(2) of the second diverter part 142 and surrounds a portion of the diverter part boss second portion 143(2).

Figure 20:
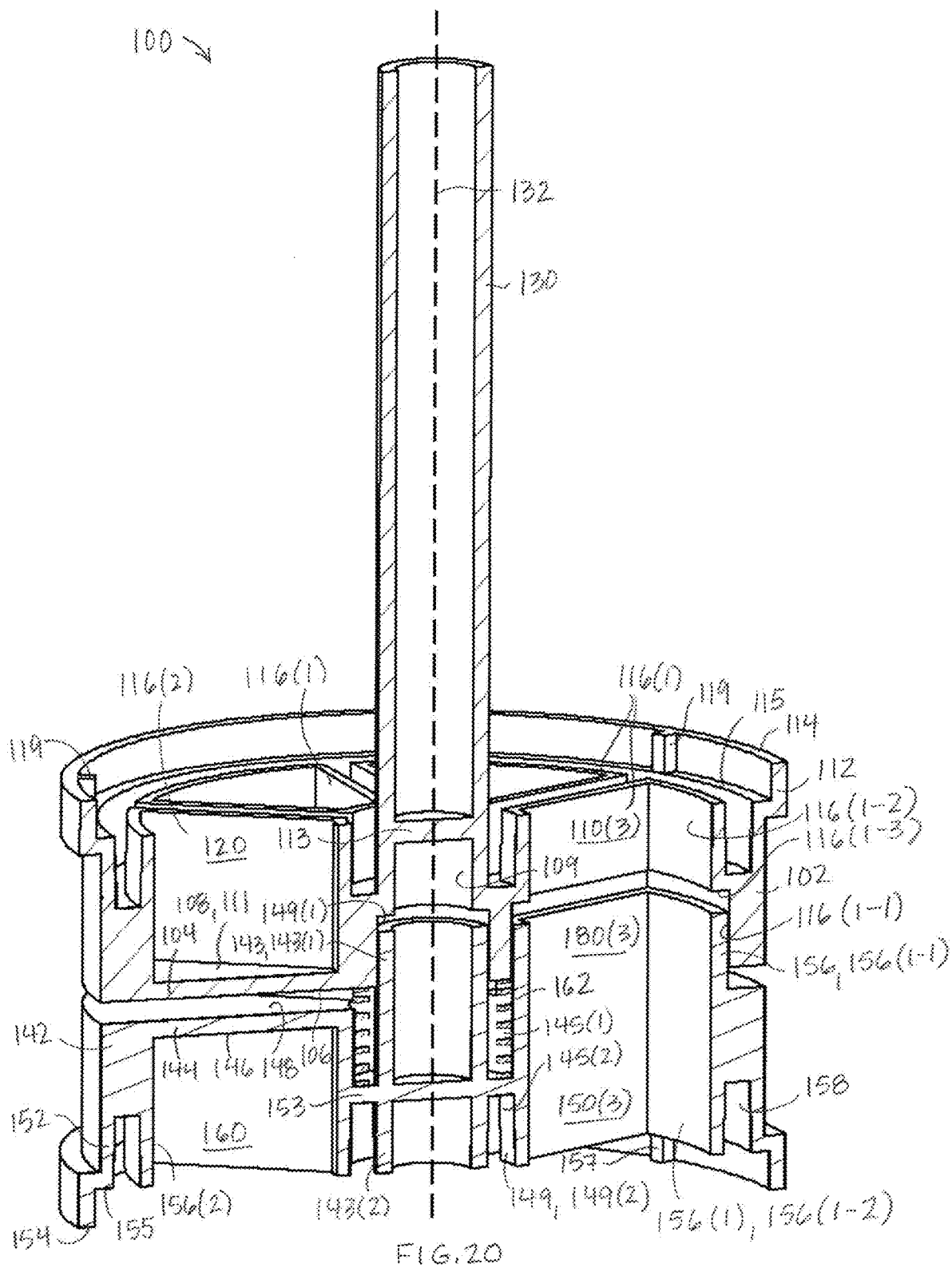
FIG. 20 is a cross-sectional view of the diverter assembly as seen along line 20-20 of FIG. 16.
Figure 21:
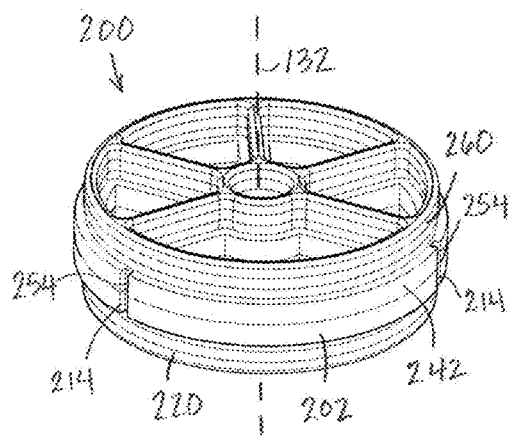
FIG. 21 is a top perspective view of the first seal assembly.
Figure 22:
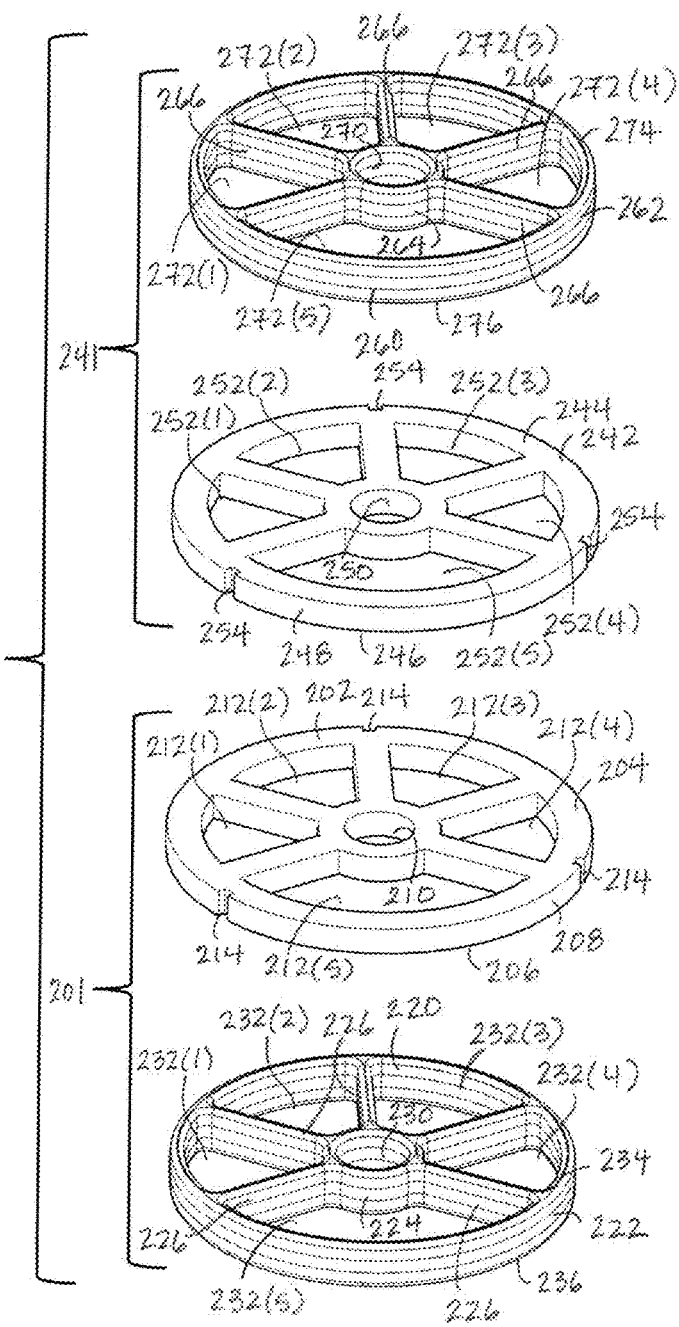
FIG. 22 is an exploded top perspective view of the first seal assembly.

Referring to FIG. 20, when the second diverter part 142, the first diverter part 102 and the spring 162 are assembled, the spring 162 is disposed between the first and second diverter parts 102, 142. In the assembled configuration, portions of the second diverter part 142 are received in the first diverter part 102 and form an interlocking engagement with the first diverter part 102. In particular, the diverter part boss first portion 143(1) of the second diverter part 142 is received in the central opening 109 of the first diverter part disc 104. In addition, the first portion 156(1-1) of each of the first partitioning walls 156(1) of the second diverter part 142 are received in the respective channels defined by the first portion 116(1-1) of each of the first partitioning walls 116(1) of the first diverter part 142. Due to the interlocking engagement of the second diverter part 142 with the first diverter part 102, the first and second diverter parts 102, 142 rotate in concert upon actuation of the diverter assembly 100 by the actuator.

Within the diverter assembly 100, the spring 162 is under compression, whereby the spring 162 biases the first diverter part 102 toward the lid 60 and the second diverter part toward the valve body base 28. By this configuration, the spring 162 provides a sealing force to the first and second seal assemblies 200, 300 and to the lid seal 501. In addition, the spring 162 cooperates with the relatively soft and resilient elastic elements 220, 260 of the first and second seal assemblies 200, 300 to permit each respective seal assembly 200, 300 to adapt to the changes in dimension caused by changes in temperature and due to wear of the diverter assembly 100 and wear of the respective seal plates—202, 242.

The diverter assembly 100 includes axially extending diverter passageways. In the illustrated embodiment, the diverter assembly 100 includes four diverter passageways 180(1), 180(2), 180(3), 180(4). Each diverter passageway 180(1), 180(2), 180(3), 180(4) is defined by a pair of the aligned through openings 110, 150 of the respective first and second diverter parts 102, 142 and the corresponding first partitioning walls 116(1), 156(1).

In the illustrated embodiment, the valve housing 20 including the valve body 22 and the lid 60, the seal carrier 520 and the first and second diverter parts 102, 142 of the diverter assembly 100 are formed of a plastic such as Polyoxymethylene (POM), Polyphenylene Sulfide (PPS), Polypropylene (PP) or Polyamide (PA). In some embodiments, the plastic may be reinforced. For example, the plastic may be a glass-reinforced polypropylene.

Seal Assemblies

The rotary disc valve 18 includes the second or first seal assembly 200 that is disposed in the valve chamber 23 between the second diverter part 142 and the base 28 of the valve body 22. In addition, the rotary disc valve 18 includes the first or second seal assembly 300 that is disposed in the valve chamber 23 between first diverter part 102 and the seal carrier 520 that is disposed adjacent to the lid 60. The first and second seal assemblies 200, 300 each provide a fluid-tight seal between the valve housing 20 and the diverter assembly 100. The first and second seal assemblies 200, 300 are identical. For this reason, only the first seal assembly 200 will be described in detail and common reference numbers are used to refer to common elements.

Referring to FIGS. 4-5 and 21-22, the first seal assembly 200 is disposed in the valve chamber 23 between the second diverter part 142 and the base 28 of the valve body 22. The first seal assembly 200 includes a first seal subassembly 201 and a second seal subassembly 241. The first seal subassembly 201 abuts the base 28 and is fixed relative to the base 28. The second seal subassembly 241 abuts the base-facing surface 146 of the second diverter part disc 144 and is fixed relative to the diverter assembly 100. The first and second seal subassemblies 201, 241 are stacked (e.g., layered) in a direction parallel to the rotational axis 132 with no intervening structures. The first and second seal subassemblies 201, 241 will now be described in detail.

The first seal subassembly 201 and the second seal subassembly 241 are each an assembly of two sealing elements. In particular, the first seal subassembly 201 includes a first seal plate 202 that is disposed between the base 28 and the second seal subassembly 241, and a first elastic element 220 that is disposed between the base 28 and the first seal plate 202.

The first seal plate 202 is a rigid cylindrical plate and includes a first plate lid-facing surface 204 that faces toward the diverter assembly 100 and lid 60, and a first plate base-facing surface 206 that faces toward the base 28. The first plate lid-facing and base-facing surfaces 204, 206 are planar (e.g., flat or level and smooth, without raised areas, protrusions, recesses, indentations or surface features or irregularities).

The first seal plate 202 includes a first plate peripheral surface 208 that extends between the first plate lid-facing and base-facing surfaces 204, 206. In the illustrated embodiment, the first peripheral surface 208 is circular when viewed in a direction parallel to the rotational axis 132. The first plate peripheral surface 208 faces toward the inner surface of the second diverter part rim 152, and thus also the valve body sidewall 24. Rectangular notches 214 are provided in the first plate peripheral surface 208. The notches 214 are spaced apart along the circumference of the first seal plate 202 and open facing the body sidewall 24. The notches 214 are shaped and dimensioned to receive a corresponding one of the housing ribs 38—that protrude inward from inner surface of the sidewall 24 at the sidewall first end 25. The housing ribs 38 are received in the notches 214 in a clearance fit, for example a location fit. In the illustrated embodiment, the first peripheral surface 208 includes three notches 214, each notch 214 cooperating with a corresponding housing rib 38 to fix the first seal plate 202 with respect to the valve body 22.

The first seal plate 202 includes several first plate through openings. In particular, the first seal plate 202 includes a central through opening 210 having a circular profile when the first seal plate 202 is viewed in a direction parallel to the rotational axis 132. In addition, the first seal plate 202 includes peripheral through openings 212 that are disposed between the central through opening 210 and the first plate peripheral surface 208. The first plate central and peripheral through openings 210, 212 each extend between the first plate lid-facing and base-facing surfaces 204, 206.

The first seal plate 202 includes five peripheral through openings 212. For specific rotational orientations of the diverter assembly 100 with respect to the valve housing 20, one or more of the peripheral through openings 212 may serve as a portion of a fluid path. In the illustrated embodiment, the first seal plate 202 includes four peripheral through openings 212(1), 212(2), 212(3), 212(4) that serve as a portion of a fluid path. Each have the shape of a circular sector when viewed in a direction parallel to the rotational axis 132 and are arranged side-by-side about the rotational axis 132. Each of the four peripheral through openings 212(1), 212(2), 212(3), 212(4) has an arc length of about 60 degrees. By this configuration, the four peripheral through openings 212(1), 212(2), 212(3), 212(4) that serve as a portion of a fluid path are clustered together at one side of the first seal plate 202, and the portion of the first seal plate 202 at the opposite side includes the fifth peripheral through opening 212(5). The fifth peripheral through opening 212(5) has a circular sector shaped profile but has a greater arc length when compared to the first through fourth peripheral through openings 212(1), 212(2), 212(3), 212(4). In the illustrated embodiment, the arc length of the fifth peripheral through opening 212(5) is about 120 degrees.

The first seal plate 202 is a thin plate in that the axial dimension, or thickness, of the first seal plate 202 is less than the dimension of the first seal plate 202 in a direction perpendicular to the axial dimension (e.g., less than the diameter of the first seal plate 202). For example, in the illustrated embodiment, the diameter of the first seal plate 202 may be in a range of 10 times the first seal plate thickness to 20 times the first seal plate thickness.

The first elastic element 220 includes an annular first element outer portion 222, an annular first element inner portion 224, and first element struts 226 that extend radially between the first element outer portion 222 and the first element inner portion 224, giving the first elastic element 220 the appearance of a spoked wheel when viewed in a direction parallel to the rotational axis 132. The first elastic element 220 has a central through opening 230 that is defined by an inner surface of the first element inner portion 224, and peripheral through openings 232. The peripheral through openings 232 are defined between the first element outer and inner portions 222, 224 and each pair of adjacent first element struts 226.

The number, shape and dimensions of the peripheral through openings 232 of the first elastic element 220 correspond to the number, shape and dimensions of the peripheral through openings 212 of the first seal plate 202. Thus, in the illustrated embodiment, the first elastic element 220 includes five peripheral through openings 232. For specific rotational orientations of the diverter assembly 100 with respect to the valve housing 20, one or more of the peripheral through openings 232 may serve as a portion of a fluid path. In the illustrated embodiment, the first elastic element 220 includes four peripheral through openings 232(1), 232(2), 232(3), 232(4) that serve as a portion of a fluid path. Each have the shape of a circular sector when viewed in a direction parallel to the rotational axis 132 and are arranged side-by-side about the rotational axis 132. Each of the four peripheral through openings 232(1), 232(2), 232(3), 232(4) has an arc length of about 60 degrees. By this configuration, the four peripheral through openings 232(1), 232(2), 232(3), 232(4) that serve as a portion of a fluid path are clustered together at one side of the first elastic element 220, and the portion of the first elastic element 220 at the opposite side includes the fifth peripheral through opening 232(5). The fifth peripheral through opening 232(5) has a circular sector shaped profile but has a greater arc length when compared to the first through fourth peripheral through openings 232(1), 232(2), 232(3), 232(4). In the illustrated embodiment, the arc length of the fifth peripheral through opening 232(5) is about 120 degrees.

Each of the first elastic element through openings 230, 232 are aligned with corresponding first seal plate through openings 210, 212, and the first elastic element through opening 230, 232 have the same shape and dimension as the first seal plate through opening 210, 212 with which it is aligned.

The first elastic element 220 has a greater elasticity than the first seal plate 202. In addition, the first elastic element 220 is formed of an elastic material that is compatible with the fluid that flows through the rotary disc valve 18 and meets the requirements for operating temperature and durability. For example, when the rotary disc valve 18 is used to control fluid in a vehicle coolant system, the first elastic element 220 is formed of an elastomer that is compatible with automotive coolant, such as ethylene propylene diene monomer (EPDM).

In the illustrated embodiment, the first element outer portion 222, the first element inner portion 224, and the first element struts 226 of the first elastic element 220 each have a rectangular shaped cross-section but are not limited to having a cross-section of this shape.

The first elastic element 220 is thin in that the axial dimension, or thickness, of the first elastic element 220 is much less than the dimension of the first elastic element 220 in a direction perpendicular to the axial dimension (e.g., much less than the diameter of the first elastic element 220). For example, in the illustrated embodiment, the diameter of the first elastic element 220 may be in a range of 10 times the elastic element thickness to 20 times the elastic element thickness. In addition, the diameter of the first elastic element 220 is slightly less than a diameter of the first seal plate 202. In the illustrated embodiment, the thickness of the first elastic element 220 is slightly greater than the thickness of the first seal plate 202. In some embodiments, the thickness of the first elastic element 220 may be as much as approximately twice the thickness of the first seal plate 202, whereas in other embodiments the thickness of the first elastic element 220 may be equal to or less than the thickness of the first seal plate 202.

In the first seal subassembly 201, the first elastic element 220 is stacked with the first seal plate 202 in a direction parallel to the rotational axis 132 with no intervening structures. In addition, the first seal plate 202 is prevented from rotating relative to the base 28 via engagement between the housing ribs 38 and the notches 214 provided on the first plate peripheral surface 208.

In the first seal subassembly 201, the base-facing surface 236 of the first elastic element 220 faces toward, and directly contacts, the base 28 of the valve body 22. More particularly, the first elastic element 220 is partially received in the base channel 52 which is shaped and dimensioned to receive the first elastic element 220 in a clearance fit, for example a sliding fit. Since the first seal subassembly 201 is under a compressive load due to the axial forces exerted by the spring 162 of the diverter assembly 100, a static seal exists between the base-facing surface 236 of the first elastic element 220 and the base channel 52 of the base 28. The term "static seal" is used herein to refer to a seal between relatively fixed parts.

In the first seal subassembly 201, the engagement between the surfaces of the elastic element 220 and facing surfaces of the base channel 52 serves to prevent relative rotation of the first elastic element 220 relative to the valve body 22. Thus, both the first elastic element 220 and the first seal plate 202 are fixed relative to the valve body 22.

In the first seal subassembly 201, the first plate base-facing surface 206 faces, and directly contacts, the lid-facing surface 234 of the first elastic element 220. Since the first seal subassembly 201 is under a compressive load due to the axial forces exerted by the spring 162 of the diverter assembly 100, a static seal exists between the first seal plate 202 and the first elastic element 220.

In the first seal subassembly 201, the first plate lid-facing surface 204 faces toward, and directly contacts, a base-facing surface 246 of a second seal plate 242 provided in the second seal subassembly 241. The first and second seal plates 202, 242 rotate relative to each other during valve operation, and the interface between the relatively-movable contacting surfaces 204, 246 provides a fluid-tight dynamic seal. The tem "dynamic seal" is used to refer to a seal between relatively moving parts. Due to the relative rotation of the first and second seal plates 202, 242, the first seal plate 202 and the second seal plate 242 are formed of a highly wear resistive material. For example, in the illustrated embodiment, the first seal plate 202 and the second seal plate 242 may be ceramic or stainless steel. However, in other embodiments, the components of the dynamic seal may be formed of other materials such as a wear resistant plastic.

In the first seal subassembly 201, which is fixed relative to the valve body 22, each of the four peripheral through openings 212(1), 212(2), 212(3), 212(4) of the first seal plate 202 is axially aligned with a corresponding one of the first, second, third and fourth valve ports P1, P2, P3, P4 of the base 28. In addition, the fifth peripheral through opening 212(5) of the first seal plate 202 is axially aligned with the fifth peripheral through opening 232(5) of the first elastic element 220 and with the relatively large opening 53 of the base 28. In addition, each of the four peripheral through openings 212(1), 212(2), 212(3), 212(4) of the first seal plate 202 is axially aligned with a corresponding one of the four peripheral through openings 232(1), 232(2), 232(3), 232(4) of the first elastic element 220.

The second seal subassembly 241 includes a second seal plate 242 that is disposed between the first seal subassembly 201 and the diverter assembly 100, and a second elastic element 260 that is disposed between the second seal plate 242 and the diverter assembly 100.

The second seal plate 242 is a rigid cylindrical plate and includes a second plate lid-facing surface 244 that faces toward the diverter assembly 100 and the lid 60, and the second plate base-facing surface 246 that faces toward the base 28 of the valve body 22. The second plate lid-facing and base-facing surfaces 244, 246 are planar (e.g., flat or level and smooth, without raised areas, protrusions, recesses, indentations or surface features or irregularities).

The second seal plate 242 includes a second plate peripheral surface 248 that extends between the first plate lid-facing and base-facing surfaces 244, 246. In the illustrated embodiment, the second peripheral surface 248 is circular when viewed in a direction parallel to the rotational axis 132. The second plate peripheral surface 248 faces an inner surface of the second diverter part rim 152. Rectangular notches 254 are provided in the second plate peripheral surface 248. The notches 254 are spaced apart along the circumference of the second seal plate 242 and open facing the second diverter part rim 152. The notches 254 are shaped and dimensioned to receive a corresponding one of the second diverter part ribs 157 that protrude inward from inner surface of the second diverter part rim 152. The second diverter part ribs 157 are received in the notches 254 in a clearance fit, for example a location fit. In the illustrated embodiment, the second plate peripheral surface 248 includes three notches 254, each notch 254 cooperating with a corresponding second diverter part rib 157 to fix the second seal plate 242 with respect to the second diverter part 142.

The second seal plate 242 includes several second plate through openings. In particular, the second seal plate 242 includes a central through opening 250 having a circular profile when the second seal plate 242 is viewed in a direction parallel to the rotational axis 132. In addition, second seal plate 242 includes peripheral through openings 252 that are disposed between the central through opening 250 and the second plate peripheral surface 248. The second plate central and peripheral through openings 250, 252 each extend between the second plate lid-facing and base-facing surfaces 244, 246.

The second seal plate 242 includes five peripheral through openings 252. For specific rotational orientations of the diverter assembly 100 with respect to the valve housing 20, one or more of the peripheral through openings 252 may serve as a portion of a fluid path. In the illustrated embodiment, the second seal plate 242 includes four peripheral through openings 252(1), 252(2), 252(3), 252(4) that serve as a portion of a fluid path. Each have the shape of a circular sector when viewed in a direction parallel to the rotational axis 132 and are arranged side-by-side about the rotational axis 132. Each of the four peripheral through openings 252(1), 252(2), 252(3), 252(4) has an arc length of about 60 degrees. By this configuration, the four peripheral through openings 252(1), 252(2), 252(3), 252(4) that serve as a portion of a fluid path are clustered together at one side of the second seal plate 242, and the portion of the second seal plate 242 at the opposite side includes the fifth peripheral through opening 252(5). The fifth peripheral through opening 252(5) has a circular sector shaped profile but has a greater arc length when compared to the first through fourth peripheral through openings 252(1), 252(2), 252(3), 252(4). In the illustrated embodiment, the arc length of the fifth peripheral through opening 252(5) is about 120 degrees.

Like the first seal plate 202, the second seal plate 242 is a thin plate in that the axial dimension, or thickness, of the second seal plate 242 is less than the dimension of the second seal plate 242 in a direction perpendicular to the axial dimension (e.g., less than the diameter of the first seal plate 202). For example, in the illustrated embodiment, the diameter of the second seal plate 242 may be in a range of 10 times the second seal plate thickness to 20 times the second seal plate thickness. In the illustrated embodiment, the second seal plate 242 has approximately the same thickness as that of the first seal plate 202.

The second elastic element 260 includes an annular second element outer portion 262, an annular second element inner portion 264, and second element struts 266 that extend radially between the second element outer portion 262 and the second element inner portion 264, giving the second elastic element 260 the appearance of a spoked wheel when viewed in a direction parallel to the rotational axis 132.

The second elastic element 260 has a central through opening 270 that is defined by an inner surface of the second element inner portion 264, and peripheral through openings 272. The peripheral through openings 272 are defined between the second element outer and inner portions 262, 264 and each pair of adjacent first element struts 266.

The number, shape and dimensions of the peripheral through openings 272 of the second elastic element 260 correspond to the number, shape and dimensions of the peripheral through openings 252 of the second seal plate 242. Thus, in the illustrated embodiment, the second elastic element 260 includes five peripheral through openings 272. For specific rotational orientations of the diverter assembly 100 with respect to the valve housing 20, one or more of the peripheral through openings 272 may serve as a portion of a fluid path. In the illustrated embodiment, second elastic element 260 includes four peripheral through openings 272(1), 272(2), 272(3), 272(4) that serve as a portion of a fluid path. Each have the shape of a circular sector when viewed in a direction parallel to the rotational axis 132 and are arranged side-by-side about the rotational axis 132. Each of the four peripheral through openings 272(1), 272(2), 272(3), 272(4) has an arc length of about 60 degrees. By this configuration, the four peripheral through openings 272(1), 272(2), 272(3), 272(4) that serve as a portion of a fluid path are clustered together at one side of the second elastic element 260, and the portion of the second elastic element 260 at the opposite side includes the fifth peripheral through opening 272(5). The fifth peripheral through opening 272(5) has a circular sector shaped profile but has a greater arc length when compared to the first through fourth peripheral through openings 272(1), 272(2), 272(3), 272(4). In the illustrated embodiment, the arc length of the fifth peripheral through opening 272(5) is about 120 degrees.

Each of the second elastic element through openings 270, 272 are aligned with corresponding second seal plate through openings 250, 252, and the second elastic element through openings 270, 272 have the same shape and dimension as the second seal plate through opening 250, 252 with which it is aligned.

The second elastic element 260 has a greater elasticity than second seal plate 242. In addition, the second elastic element 260 is formed of an elastic material that is compatible with the fluid that flows through the rotary disc valve 18 and meets the requirements for operating temperature and durability. For example, when the rotary disc valve 18 is used to control fluid in a vehicle coolant system, the second elastic element 260 is formed of an elastomer that is compatible with automotive coolant, such as such as ethylene propylene diene monomer (EPDM). In the illustrated embodiment, the second elastic element 260 is identical to the first elastic element 220 but is not limited to this configuration.

In the illustrated embodiment, the second element outer portion 262, the second element inner portion 264, and the second element struts 266 of the second elastic element 260 each have a rectangular cross-sectional shape but are not limited to having a cross-section of this shape.

The second elastic element 260 is thin in that the axial dimension, or thickness, of the second elastic element 260 is much less than the dimension of the second elastic element 260 in a direction perpendicular to the axial dimension (e.g., much less than the diameter of the second elastic element 260). For example, in the illustrated embodiment, the diameter of the second elastic element 260 may be in a range of 10 times the elastic element thickness to 20 times the elastic element thickness. In addition, the diameter of the second elastic element 260 is slightly less than a diameter of the second seal plate 242. In the illustrated embodiment, the thickness of the second elastic element 260 is slightly greater than the thickness of the second seal plate 242. In some embodiments, the thickness of the second elastic element 260 may be as much as approximately twice the thickness of the second seal plate 242, whereas in other embodiments the thickness of the second elastic element 260 may be equal to or less than the thickness of the second seal plate 242.

In the second seal subassembly 241, the second elastic element 260 is stacked with the second seal plate 242 in a direction parallel to the rotational axis 132 with no intervening structures. In addition, the second seal plate 242 is prevented from rotating relative to the second diverter part 142 via engagement between the ribs 157 provided on the inner surface of the second diverter part rim 152 and the notches 254 provided on the second plate peripheral surface 248.

In the second seal subassembly 241, the base-facing surface 246 of the second seal plate 242 faces, and directly contacts, a corresponding facing surface 204 of the first seal plate 202. As previously discussed, the first and second seal plates 202, 242 rotate relative to each other during valve operation, and the interface between the relatively-movable contacting surfaces 204, 246 provides a fluid-tight dynamic seal.

In the second seal subassembly 241, the lid-facing surface 244 of the second seal plate 242 faces, and directly contacts, the base-facing surface 276 of the second elastic element 260. Since the second seal subassembly 241 is under a compressive load due to the axial forces exerted by the spring 162 of the diverter assembly 100, a static seal exists between the lid-facing surface 244 of the second seal plate 242 and the base-facing surface 276 of the second elastic element 260.

In the second seal subassembly 241, the lid-facing surface 274 of the second elastic element 260 faces, and directly contacts, the second diverter part base facing surface 146. More particularly, the second elastic element 260 rests in the second diverter part channel 158 which is shaped and dimensioned to receive the second elastic element 260 in a clearance fit, for example a sliding fit. The engagement between the surfaces of the second elastic element 260 and facing surfaces of the second diverter part channel 158 serves to prevent relative rotation of the second elastic element 260 relative to the valve body 22. Thus, both the second elastic element 260 and the second seal plate 242 are fixed relative to the diverter assembly 100.

In addition, since the second seal subassembly 241 is under a compressive load due to the axial forces exerted by the spring 162 of the diverter assembly 100, a static seal exists between the lid-facing surface 274 of the second elastic element 260 and the second diverter part channel 158.

In the second seal subassembly 241, which is fixed relative to the diverter assembly 100, each of the four peripheral through openings 252(1), 252(2), 252(3), 252(4) of the second seal plate 242 is axially aligned with a corresponding one of the four second diverter part through openings 150(1), 150(2), 150(3), 150(4) and thus is axially aligned and communicates with a corresponding one of the diverter passageways 180(1), 180(2), 180(3), 180(4). The fifth peripheral through opening 252(5) of the second seal plate 242 is axially aligned with the second diverter pocket 160. In addition, each of the four peripheral through openings 252(1), 252(2), 252(3), 252(4) of the second seal plate 242 is axially aligned with a corresponding one of the four peripheral through openings 272(1), 272(2), 272(3), 272(4) of the second elastic element 260.

The second seal assembly 300 is disposed in the valve chamber 23 between the first diverter part 102 and the lid 60. More specifically, the second seal assembly 300 is disposed in the valve chamber 23 between the first diverter part 102 and the seal carrier 520, which is fixed relative to the valve body 22. The second seal assembly 300 includes third seal subassembly 301 and fourth seal subassembly 341. The third seal subassembly 301 is identical to the first seal subassembly 201, and common reference numbers are used to refer to common elements. The third seal subassembly 301 abuts the diverter assembly 100 and is fixed relative to the diverter assembly 100. In addition, the fourth seal subassembly 341 is identical to the second seal subassembly 241, and common reference numbers are used to refer to common elements. The fourth seal subassembly 341 abuts the base-facing surface 522 of the seal carrier 520 and is fixed relative to the seal carrier 520. The third and fourth seal subassemblies 301, 341 are stacked (e.g., layered) in a direction parallel to the rotational axis 132 with no intervening structures.

In the third seal subassembly 301, the first elastic element 220 is stacked with the first seal plate 202 in a direction parallel to the rotational axis 132 with no intervening structures. The first seal plate 202 is prevented from rotating relative to the first diverter part 102 via engagement between first diverter part ribs 119 that protrude from the inner surface of the first diverter part rim 112 and the notches 214 provided on the first plate peripheral surface 208.

In the third seal subassembly 301, the base-facing surface 236 of the first elastic element 220 faces toward, and directly contacts, the lid-facing surface 108 of the first diverter part 102. More particularly, the first elastic element 220 is partially received in the first diverter part channel 118 which is shaped and dimensioned to receive the first elastic element 220 in a clearance fit, for example a sliding fit. Since the first seal subassembly 201 is under a compressive load due to the axial forces exerted by the spring 162 of the diverter assembly 100, a static seal exists between the base-facing surface 236 of the first elastic element 220 and first diverter part channel 118 of the first diverter part 102.

In the third seal subassembly 301, the engagement between the surfaces of the elastic element 220 and facing surfaces of the first diverter part channel 118 serves to prevent relative rotation of the first elastic element 220 relative to the first diverter part 102. Thus, both the first elastic element 220 and the first seal plate 202 are fixed relative to the first diverter part 102, and thus also to the diverter assembly 100.

In the third seal subassembly 301, the first plate base-facing surface 206 faces, and directly contacts, the lid-facing surface 234 of the first elastic element 220. Since the first seal subassembly 201 is under a compressive load due to the axial forces exerted by the spring 162 of the diverter assembly 100, a static seal exists between the first seal plate 202 and the first elastic element 220.

In the third seal subassembly 301, the first plate lid-facing surface 204 faces toward, and directly contacts, a base-facing surface 246 of the second seal plate 242 provided in the fourth seal subassembly 341. The first and second seal plates 202, 242 rotate relative to each other during valve operation, and the interface between the relatively-movable contacting surfaces 204, 246 provides a fluid-tight dynamic seal.

In the third seal subassembly 301, which is fixed relative to the diverter assembly 100, each of the four peripheral through openings 212(1), 212(2), 212(3), 212(4) of the first seal plate 202 is axially aligned with a corresponding one of the four first diverter part through openings 110(1), 110(2), 110(3), 110(4) and thus is axially aligned and communicates with a corresponding one of the diverter passageways 180(1), 180(2), 180(3), 180(4). The fifth peripheral through opening 212(5) of the first seal plate 202 is axially aligned with the first diverter pocket 120. In addition, each of the four peripheral through openings 212(1), 212(2), 212(3), 212(4) of the first seal plate 202 is axially aligned with a corresponding one of the four peripheral through openings 232(1), 232(2), 232(3), 232(4) of the first elastic element 220.

When the diverter assembly 100 is rotated about the rotational axis 132 relative to the valve housing 20, the second seal subassembly 241 and the third seal sub assembly 301 rotate in concert with the diverter assembly 100. In addition, the respective first peripheral openings 212(1), 232(1) of the second and third seal subassemblies 241, 301 are aligned with the first diverter passageway 180(1), the respective second peripheral openings 212(2), 232(2) of the second and third seal subassemblies 241, 301 are aligned with the second diverter passageway 180(2), the respective third peripheral openings 212(3), 232(3) of the second and third seal subassemblies 241, 301 are aligned with the third diverter passageway 180(3), and the respective fourth peripheral openings 212(4), 232(4) of the second and third seal subassemblies 241, 301 are aligned with the fourth diverter passageway 180(4), regardless of the rotational orientation of the diverter assembly 100.

In the fourth seal subassembly 341, the second elastic element 260 is stacked with the second seal plate 242 in a direction parallel to the rotational axis 132 with no intervening structures. In addition, the second seal plate 242 is prevented from rotating relative to the seal carrier 520 via engagement between the seal carrier ribs 532 and the notches 254 provided on the second plate peripheral surface 248.

In the fourth seal subassembly 341, the base-facing surface 246 of the second seal plate 242 faces, and directly contacts, a corresponding facing surface 204 of the first seal plate 202. As previously discussed, the first and second seal plates 202, 242 rotate relative to each other during valve operation, and the interface between the relatively-movable contacting surfaces 204, 246 provides a fluid-tight dynamic seal.

In the fourth seal subassembly 341, the lid-facing surface 244 of the second seal plate 242 faces, and directly contacts, the base-facing surface 276 of the second elastic element 260. Since the second seal subassembly 241 is under a compressive load due to the axial forces exerted by the spring 162 of the diverter assembly 100, a static seal exists between the lid-facing surface 244 of the second seal plate 242 and the base-facing surface 276 of the second elastic element 260.

In the fourth seal subassembly 341, the lid-facing surface 274 of the second elastic element 260 faces, and directly contacts, base-facing surface 522 of the seal carrier 520. More particularly, the second elastic element 260 rests in the carrier channel 530 which is shaped and dimensioned to receive the second elastic element 260 in a clearance fit, for example a sliding fit. The engagement between the surfaces of the second elastic element 260 and facing surfaces of the carrier channel 530 serves to prevent relative rotation of the second elastic element 260 relative to the valve body 22. Thus, both the second elastic element 260 and the second seal plate 242 are fixed relative to the seal carrier 520, and thus also relative to the valve housing 20.

In addition, since the second seal subassembly 241 is under a compressive load due to the axial forces exerted by the spring 162 of the diverter assembly 100, a static seal exists between the lid-facing surface 274 of the second elastic element 260 and the carrier channel 530.

In the fourth seal subassembly 341, which is fixed relative to the seal carrier 520 and the lid 60, each of the four peripheral through openings 252(1), 252(2), 252(3), 252(4) of the second seal plate 242 is axially aligned with a corresponding one of the four seal carrier peripheral through openings 542(1), 542(2), 542(3), 542(4) and thus is axially aligned and communicates with a corresponding one of the recesses F1(1), F2(1), F3(1), F4(1) of the lid 60. The fifth peripheral through opening 252(5) of the second seal plate 242 is axially aligned with the fifth carrier peripheral through opening 542(5) and the lid closed portion 70. In addition, each of the four peripheral through openings 252(1), 252(2), 252(3), 252(4) of the second seal plate 242 is axially aligned with a corresponding one of the four peripheral through openings 272(1), 272(2), 272(3), 272(4) of the second elastic element 260.

Switching States

The rotational orientation of the diverter assembly 100 relative to the valve housing 20 determines one or more fluid paths through corresponding ones of the valve ports P1, P2, P3, P4, P5, P6, P7, P8 whereby the distribution of coolant fluid in the cooling system 1 is controlled. In the illustrated embodiment, the rotary disc valve 18 includes four switching states, each switching state corresponding to a specific, unique rotational orientation of the diverter assembly 100 s relative to the valve housing 20. For each switching state, there are four fluid paths through the valve housing 20, each fluid path connecting a pair of the valve ports.

Referring to FIGS. 23-26, the first switching state of the rotary disc valve 18 corresponds to a first diverter assembly rotational orientation in which the first diverter passageway 180(1) is axially aligned with the first formation F1 of the lid 60. In the first switching state, the first and second diverter pockets 120, 160 are axially aligned with the lid closed portion 70. In the first switching state, the rotary disc valve 18 provides the following four fluid paths 611, 612, 613, 614 through the valve housing 20:

The first fluid path of the first switching state 611 includes the fifth valve port P5 as the fluid inlet and the first valve port P1 as the fluid outlet. In addition, the first fluid path of the first switching state 611 includes the second subchamber 32, the recess F1(1) of the first formation F1 and the first diverter passageway 180(1). In particular, fluid entering the fifth valve port P5 is directed axially to the recess F1(1) of the first formation F1 via the second subchamber 32. Fluid entering the recess F1(1) of the first formation F1 is directed radially inward and then axially to the first diverter passageway 180(1) via passage through the corresponding first peripheral through openings 542(1), 564(1), 272(1), 252(1) of the seal carrier 520, the lid seal 501, and the fourth seal subassembly 341. Fluid entering the first diverter passageway 180(1) is directed axially to the first valve port P1 through the corresponding first peripheral through openings 212(1), 232(1) of the first seal subassembly 201. The fluid using the first fluid path of the first switching state 611 exits the rotary disc valve 18 via the first valve port P1.

The second fluid path of the first switching state 612 includes the second valve port P2 as the fluid inlet and the sixth valve port P6 as the fluid outlet. In addition, the second fluid path of the first switching state 612 includes the second diverter passageway 180(2), the recess F2(1) of the second formation F2 and the third subchamber 33. In particular, fluid entering the second valve port P2 is directed axially to the second diverter passageway 180(2) via the corresponding second peripheral through openings 212(2), 232(2) of the first seal subassembly 201. Fluid exiting the second diverter passageway 180(2) is directed axially to the recess F2(1) of the second formation F2 via the corresponding second peripheral through openings 542(2), 564(2), 272(2), 252(2) of the seal carrier 520, the lid seal 501, and the fourth seal subassembly 341. Fluid entering the recess F2(1) of the second formation F2 is directed radially outward and then axially to the sixth valve port P6 via the third subchamber 33. The fluid using the second fluid path of the first switching state 612 exits the rotary disc valve 18 via the sixth valve port P6.

The third fluid path of the first switching state 613 includes the seventh valve port P7 as the fluid inlet and the third valve port P3 as the fluid outlet. In addition, the third fluid path of the first switching state 613 includes the fourth subchamber 34, the recess F3(1) of the third formation F3 and the third diverter passageway 180(3). In particular, fluid entering the seventh valve port P7 is directed axially to the recess F3(1) of the third formation F3 via the fourth subchamber 34. Fluid entering the recess F3(1) of the third formation F3 is directed radially inward and then axially to the third diverter passageway 180(3) via passage through the corresponding third peripheral through openings 542(3), 564(3), 272(3), 252(3) of the seal carrier 520, the lid seal 501, and the fourth seal subassembly 341. Fluid entering the third diverter passageway 180(3) is directed axially to the third valve port P3 through the corresponding third peripheral through openings 212(3), 232(3) of the first seal subassembly 201. The fluid using the third fluid path of the first switching state 613 exits the rotary disc valve 18 via the third valve port P3.

The fourth fluid path of the first switching state 614 includes the fourth valve port P4 as the fluid inlet and the eighth valve port P8 as the fluid outlet. In addition, the fourth fluid path of the first switching state 614 includes the fourth diverter passageway 180(4), the recess F4(1) of the fourth formation F4 and the fifth subchamber 35. In particular, fluid entering the fourth valve port P4 is directed axially to the fourth diverter passageway 180(4) via the corresponding fourth peripheral through openings 212(4), 232(4) of the first seal subassembly 201. Fluid exiting the fourth diverter passageway 180(4) is directed axially to the recess F4(1) of the fourth formation F4 via the corresponding fourth peripheral through openings 542(4), 564(4), 272(4), 252(4) of the seal carrier 520, the lid seal 501, and the fourth seal subassembly 341. Fluid entering the recess F4(1) of the fourth formation F4 is directed radially outward and then axially to the eighth valve port P8 via the fifth subchamber 35. The fluid using the fourth fluid path of the first switching state 614 exits the rotary disc valve 18 via the eighth valve port P8.

Referring to FIGS. 27-30, the second switching state of the rotary disc valve 18 corresponds to a second diverter assembly rotational orientation in which the first diverter passageway 180(1) is axially aligned with the fourth formation F4 of the lid 60. In the second switching state, the first and second diverter pockets 120, 160 are axially aligned with the second and third formations F2, F3. In the second switching state, the rotary disc valve 18 provides the following four fluid paths 621, 622, 623, 624 through the valve housing 20:

The first fluid path of the second switching state 621 includes the fifth valve port P5 as the fluid inlet and the first valve port P1 as the fluid outlet. In addition, the first fluid path of the second switching state 621 includes the second subchamber 32, the recess F1(1) of the first formation F1 and the fourth diverter passageway 180(4). In particular, fluid entering the fifth valve port P5 is directed axially to the recess F1(1) of the first formation F1 via the second subchamber 32. Fluid entering the recess F1(1) of the first formation F1 is directed radially inward and then axially to the fourth diverter passageway 180(4) via passage through the corresponding first peripheral through openings 542(1), 564(1), 272(1), 252(1) of the seal carrier 520, the lid seal 501, and the fourth seal subassembly 341. Fluid entering the fourth diverter passageway 180(4) is directed axially to the first valve port P1 through the corresponding first peripheral through openings 212(1), 232(1) of the first seal subassembly 201. The fluid using the first fluid path of the second switching state 621 exits the rotary disc valve 18 via the first valve port P1.

The second fluid path of the second switching state 622 includes the second valve port P2 as the fluid inlet and the third valve port P3 as the fluid outlet. In addition, the second fluid path of the second switching state 622 includes the second diverter pocket 160. In particular, fluid entering the second valve port P2 is directed to the second diverter pocket 160 via the corresponding second peripheral through openings 212(2), 232(2) of the first seal subassembly 201. Fluid entering the second diverter pocket 160 is directed circumferentially to the third valve port P3 via the corresponding third peripheral through openings 212(3), 232(3) of the first seal subassembly 201. The fluid using the second fluid path of the second switching state 622 exits the rotary disc valve 18 via the third valve port P3.

The third fluid path of the second switching state 623 includes the seventh valve port P7 as the fluid inlet and the sixth valve port P6 as the fluid outlet. In addition, the third fluid path of the second switching state 623 includes the fourth subchamber 34, the recess F3(1) of the third formation F3, the first diverter pocket 120, the recess F2(1) of the second formation F2 and the third subchamber 33. In particular, fluid entering the seventh valve port P7 is directed axially to the recess F3(1) of the third formation F3 via the fourth subchamber 34. Fluid entering the recess F3(1) of the third formation F3 is directed radially inward and then axially to the first diverter pocket 120 via passage through the corresponding third peripheral through openings 542(3), 564(3), 272(3), 252(3) of the seal carrier 520, the lid seal 501, and the fourth seal subassembly 341. Fluid entering the first diverter pocket 120 is directed circumferentially and then axially to the recess F2(l) of the second formation F2 through the corresponding second peripheral through openings 542(2), 564(2), 272(2), 252(2) of the seal carrier 520, the lid seal 501, and the fourth seal subassembly 341. Fluid entering the recess F2(1) of the second formation F2 is directed radially outward and then axially to the sixth port P6 via the third subchamber 33. The fluid using the third fluid path of the second switching state 623 exits the rotary disc valve 18 via the sixth valve port P6.

The fourth fluid path of the second switching state 624 includes the fourth valve port P4 as the fluid inlet and the eighth valve port P8 as the fluid outlet. In addition, the fourth fluid path of the second switching state 624 includes the first diverter passageway 180(1), the recess F4(1) of the fourth formation F4 and the fifth subchamber 35. In particular, fluid entering the fourth valve port P4 is directed axially to the first diverter passageway 180(1) via the corresponding fourth peripheral through openings 212(4), 232(4) of the first seal subassembly 201. Fluid exiting the first diverter passageway 180(1) is directed axially to the recess F4(1) of the fourth formation F4 via the corresponding fourth peripheral through openings 542(4), 564(4), 272(4), 252(4) of the seal carrier 520, the lid seal 501, and the fourth seal subassembly 341. Fluid entering the recess F4(1) of the fourth formation F4 is directed radially outward and then axially to the eighth valve port P8 via the fifth subchamber 35. The fluid using the fourth fluid path of the second switching state 624 exits the rotary disc valve 18 via the eighth valve port P8.

Referring to FIGS. 31-34, the third switching state of the rotary disc valve 18 corresponds to a third diverter assembly rotational orientation in which the first and second diverter passageways 180(1), 180(2) are axially aligned with the closed portion 70 of the lid 60. In the third switching state, the first and second diverter pockets 120, 160 are axially aligned with the third and fourth formations F3, F4 of the lid 60. In the third switching state, the rotary disc valve 18 provides the following four fluid paths 631, 632, 633, 634 through the valve housing 20:

The first fluid path of the third switching state 631 includes the fifth valve port P5 as the fluid inlet and the first valve port P1 as the fluid outlet. In addition, the first fluid path of the third switching state 631 includes the second subchamber 32, the recess F1(1) of the first formation F1 and the third diverter passageway 180(3). In particular, fluid entering the fifth valve port P5 is directed axially to the recess F1(1) of the first formation F1 via the second subchamber 32. Fluid entering the recess F1(1) of the first formation F1 is directed radially inward and then axially to the third diverter passageway 180(3) via passage through the corresponding first peripheral through openings 542(1), 564(1), 272(1), 252(1) of the seal carrier 520, the lid seal 501, and the fourth seal subassembly 341. Fluid entering the third diverter passageway 180(3) is directed axially to the first valve port P1 through the corresponding first peripheral through openings 212(1), 232(1) of the first seal subassembly 201. The fluid using the first fluid path of the third switching state 631 exits the rotary disc valve 18 via the first valve port P1.

The second fluid path of the third switching state 632 includes the second valve port P2 as the fluid inlet and the sixth valve port P6 as the fluid outlet. In addition, the second fluid path of the third switching state 632 includes the fourth diverter passageway 180(4), the recess F2(1) of the second formation F2 and the third subchamber 33. In particular, fluid entering the second valve port P2 is directed axially to the fourth diverter passageway 180(4) via the corresponding second peripheral through openings 212(2), 232(2) of the first seal subassembly 201. Fluid exiting the fourth diverter passageway 180(4) is directed axially to the recess F2(1) of the second formation F2 via the corresponding second peripheral through openings 542(2), 564(2), 272(2), 252(2) of the seal carrier 520, the lid seal 501, and the fourth seal subassembly 341. Fluid entering the recess F2(1) of the second formation F2 is directed radially outward and then axially to the sixth valve port P6 via the third subchamber 33. The fluid using the second fluid path of the third switching state 632 exits the rotary disc valve 18 via the sixth valve port P6.

The third fluid path of the third switching state 633 includes the seventh valve port P7 as the fluid inlet and the eighth valve port P8 as the fluid outlet. In addition, the third fluid path of the third switching state 633 includes the fourth subchamber 34, the recess F3(1) of the third formation F3, the first diverter pocket 120, the recess F4(1) of the fourth formation F4 and the fifth subchamber 35. In particular, fluid entering the seventh valve port P7 is directed axially to the recess F3(1) of the third formation F3 via the fourth subchamber 34. Fluid entering the recess F3(1) of the third formation F3 is directed radially inward and then axially to the first diverter pocket 120 via passage through the corresponding third peripheral through openings 542(3), 564(3), 272(3), 252(3) of the seal carrier 520, the lid seal 501, and the fourth seal subassembly 341. Fluid entering the first diverter pocket 120 is directed circumferentially and then axially to the recess F4(1) of the fourth formation F4 through the corresponding fourth peripheral through openings 542(4), 564(4), 272(4), 252(4) of the seal carrier 520, the lid seal 501, and the fourth seal subassembly 341. Fluid entering the recess F4(1) of the fourth formation F4 is directed radially outward and then axially to the eighth port P8 via the fifth subchamber 35. The fluid using the third fluid path of the third switching state 633 exits the rotary disc valve 18 via the eighth valve port P8.

The fourth fluid path of the third switching state 634 includes the fourth valve port P4 as the fluid inlet and the third valve port P3 as the fluid outlet. In addition, the fourth fluid path of the third switching state 634 includes the second diverter pocket 160. In particular, fluid entering the fourth valve port P4 is directed to the second diverter pocket 160 via the corresponding fourth peripheral through openings 212(4), 232(4) of the first seal subassembly 201. Fluid entering the second diverter pocket 160 is directed circumferentially to the third valve port P3 via the corresponding third peripheral through openings 212(3), 232(3) of the first seal subassembly 201. The fluid using the fourth fluid path of the third switching state 634 exits the rotary disc valve 18 via the third valve port P3.

Referring to FIGS. 35-38, the fourth switching state of the rotary disc valve 18 corresponds to a fourth diverter assembly rotational orientation in which the first and second diverter passageways 180(1), 180(2) are axially aligned with the third and fourth formations F3, F4 of the lid 60. In the fourth switching state, the first and second diverter pockets 120, 160 are axially aligned with the first and second formations F1, F2 of the lid 60. In the fourth switching state, the rotary disc valve 18 provides the following four fluid paths 641, 642, 643, 644 through the valve housing 20:

The first fluid path of the fourth switching state 641 includes the first valve port P1 as the fluid inlet and the second valve port P2 as the fluid outlet. In addition, the first fluid path of the fourth switching state 641 includes the second diverter pocket 160. In particular, fluid entering the first valve port P1 is directed to the second diverter pocket 160 via the corresponding first peripheral through openings 212(1), 232(1) of the first seal subassembly 201. Fluid entering the second diverter pocket 160 is directed circumferentially to the second valve port P2 via the corresponding second peripheral through openings 212(2), 232(2) of the first seal subassembly 201. The fluid using the first fluid path of the fourth switching state 641 exits the rotary disc valve 18 via the second valve port P2.

The second fluid path of the fourth switching state 642 includes the sixth valve port P6 as the fluid inlet and the fifth valve port P5 as the fluid outlet. In addition, the second fluid path of the fourth switching state 642 includes the third subchamber 33, the recess F2(1) of the second formation F2, the first diverter pocket 120, the recess F1(1) of the first formation F1 and the second subchamber 32. In particular, fluid entering the sixth valve port P6 is directed axially to the recess F2(1) of the second formation F2 via the third subchamber 33. Fluid entering the recess F2(1) of the second formation F2 is directed radially inward and then axially to the first diverter pocket 120 via passage through the corresponding second peripheral through openings 542(2), 564(2), 272(2), 252(2) of the seal carrier 520, the lid seal 501, and the fourth seal subassembly 341. Fluid entering the first diverter pocket 120 is directed circumferentially and then axially to the recess F1(1) of the first formation F1 through the corresponding first peripheral through openings 542(1), 564(1), 272(1), 252(1) of the seal carrier 520, the lid seal 501, and the fourth seal subassembly 341. Fluid entering the recess F1(1) of the first formation F1 is directed radially outward and then axially to the fifth valve port P5 via the second subchamber 32. The fluid using the second fluid path of the fourth switching state 642 exits the rotary disc valve 18 via the fifth valve port P5.

The third fluid path of the fourth switching state 643 includes the seventh valve port P7 as the fluid inlet and the third valve port P3 as the fluid outlet. In addition, the third fluid path of the fourth switching state 643 includes the fourth subchamber 34, the recess F3(1) of the third formation F3 and the first diverter passageway 180(1). In particular, fluid entering the seventh valve port P7 is directed axially to the recess F3(1) of the third formation F3 via the fourth subchamber 34. Fluid entering the recess F3(1) of the third formation F3 is directed radially inward and then axially to the first diverter passageway 180(1) via passage through the corresponding third peripheral through openings 542(3), 564(3), 272(3), 252(3) of the seal carrier 520, the lid seal 501, and the fourth seal subassembly 341. Fluid entering the first diverter passageway 180(1) is directed axially to the third valve port P3 through the corresponding third peripheral through openings 212(3), 232(3) of the first seal subassembly 201. The fluid using the third fluid path of the fourth switching state 643 exits the rotary disc valve 18 via the third valve port P3.

The fourth fluid path of the fourth switching state 644 includes the fourth valve port P4 as the fluid inlet and the eighth valve port P8 as the fluid outlet. In addition, the fourth fluid path of the fourth switching state 644 includes the second diverter passageway 180(2), the recess F4(*l*) of the fourth formation F4 and the fifth subchamber 35. In particular, fluid entering the fourth valve port P4 is directed axially to the second diverter passageway 180(2) via the corresponding fourth peripheral through openings 212(4), 232(4) of the first seal subassembly 201. Fluid exiting the second diverter passageway 180(2) is directed axially to the recess F4(1) of the fourth formation F4 via the corresponding fourth peripheral through openings 542(4), 564(4), 272 (4), 252(4) of the seal carrier 520, the lid seal 501, and the fourth seal subassembly 341. Fluid entering the recess F4(1) of the fourth formation F4 is directed radially outward and then axially to the eighth valve port P8 via the fifth subchamber 35. The fluid using the fourth fluid path of the fourth switching state 644 exits the rotary disc valve 18 via the eighth valve port P8.

The multi-port rotary disc valve 18 may be is used to distribute fluid through complex fluid delivery systems such as the vehicle coolant system described above. The multi-port nature of the rotary disc valve allows a single valve-and-actuator assembly to perform the switching of multiple coolant streams, while reducing the complexity of a vehicle thermal management system in order to increase efficiency, reduce system costs and improve system reliability.

Although the illustrated embodiment includes eight valve ports P1, P2, P3, P4, P5, P6, P7, P8 the number of valve ports is not limited to eight and the number of valve ports provided is determined by the specific application. The concept could also be used for valves with six to twelve ports or more.

In the illustrated embodiment, elastomeric seals referred to as elastic elements 220, 260 are disposed between the seal plates 202, 242 and the diverter assembly 100 or a respective housing component (e.g., the base 28 or the seal carrier 520). However, in another embodiment, the elastic elements 220, 260 may be omitted and the seal plates 202, 242 may be insert molded into the respective diverter assembly or housing component with which it is associated.

Selective illustrative embodiments of the multi-port rotary disc valve are described above in some detail. It should be understood that only structures considered necessary for clarifying the multi-port rotary disc valve have been described herein. Other conventional structures, and those of ancillary and auxiliary components of the multi-port rotary disc valve and/or vehicle cooling system are assumed to be known and understood by those skilled in the art. Moreover, while a working example of multi-port rotary disc valve has been described above, the multi-port rotary disc valve and/or vehicle cooling system are not limited to the working example described above, but various design alterations may be carried out without departing from the multi-port rotary disc valve as set forth in the claims.

What is claimed, is:

1. A valve comprising:
   a valve housing including
      a sidewall having an open first end and an open second end that is opposite the first end,
      a detachable lid that closes the first end of the sidewall,
      a base that is disposed at the second end of the sidewall and is perpendicular to the sidewall, the base, the lid and the sidewall cooperating to define a chamber, and
      valve ports, each valve port communicating with the chamber;
   a diverter assembly disposed in the chamber, the diverter assembly configured to control fluid flow through the valve housing, the diverter assembly including a shaft that extends through an opening in the valve housing, the shaft being rotatable about a rotational axis that is parallel to the sidewall;
   wherein
   the diverter assembly comprises
      a first diverter part including the shaft and first diverter part through openings, and
      a second diverter part that is axially aligned with the first diverter part, the second diverter part including second diverter part through openings, and
      an elastic element disposed between the first diverter part and second diverter part, the elastic element biasing the first diverter part toward the lid and the second diverter part toward the base.

2. The valve of claim 1, wherein the first diverter part is mechanically engaged with the second diverter part whereby the first and second diverter parts rotate in concert.

3. The valve of claim 1, wherein
   each second diverter part through opening is axially aligned with a corresponding one of the first diverter part through openings,
   each second diverter part through opening is surrounded by a protruding partitioning wall, and
   the partitioning wall of each second diverter part through opening extends into the corresponding one of the first diverter part through openings, whereby the second diverter part is rotationally fixed relative to the first diverter part.

4. The valve of claim 1, comprising:
   a first seal assembly disposed in the chamber between the diverter assembly and the base; and
   a second seal assembly disposed in the chamber between the diverter assembly and the lid, whereby the diverter assembly is disposed between, and axially aligned with, the first seal assembly and the second seal assembly.

5. The valve of claim 4, wherein the diverter assembly biases the first seal assembly toward the base and the diverter assembly biases the second seal assembly toward the lid.

6. The valve of claim 4, comprising
a carrier disposed in the chamber between the first seal assembly and the lid, and
an elastomeric seal disposed between the carrier and the lid, the diverter assembly compressing the elastomeric seal between the carrier and the lid.

7. The valve of claim 6, comprising
an annular seal that surrounds a periphery of the carrier, the annular seal providing a fluid tight seal between the periphery of the carrier and an inner surface of the valve housing.

8. The valve of claim 6, wherein the carrier is fixed relative to the housing.

9. The valve of claim 6, wherein the carrier includes carrier through holes, and in predetermined rotational orientations of the diverter assembly relative to the housing, at least one carrier through hole is axially aligned with at least one first diverter part through opening.

10. The valve of claim 1, wherein the lid includes
an inner surface that faces the chamber,
an outer surface that is opposite the inner surface, and
formations that form domes that protrude from the lid outer surface, one of the domes overlapping at least one first diverter part through opening when the lid is viewed in a direction parallel to the rotational axis.

11. The valve of claim 10, wherein
the valve housing includes chamber walls that segregate the chamber into subchambers that each provide a portion of a fluid path through the valve housing,
at least one valve port communicates with each subchamber,
the subchambers comprise a cylindrical first subchamber that is centered on the rotational axis, and a second subchamber that is segregated from the first subchamber,
the diverter assembly is disposed in the first subchamber, and
at least one lid formation configured to be aligned, when viewed in a direction parallel to the rotational axis, with both a portion of the first subchamber and a portion of the second subchamber, whereby the lid formation provides fluid communication between the first subchamber and the second subchamber.

12. The valve of claim 11, wherein
the subchambers comprise a third subchamber that is segregated from, both the first subchamber and the second subchamber,
the second subchamber and the third subchamber are disposed radially outward relative to the first subchamber,
the lid includes a first lid formation and a second lid formation,
the first lid formation provides fluid communication between the first subchamber and the second subchamber, and
the second lid formation provides fluid communication between the first subchamber and the third subchamber.

13. The valve of claim 1, comprising
a first seal assembly disposed in the chamber between the diverter assembly and the base;
a second seal assembly disposed in the chamber between the diverter assembly and the lid, whereby the diverter assembly is disposed between, and axially aligned with, the first seal assembly and the second seal assembly, and
chamber walls that segregate the chamber into subchambers, each subchamber providing a portion of a fluid path through the valve housing,
wherein
at least one valve port communicates with each subchamber,
the subchambers comprise a cylindrical first subchamber that is centered on the rotational axis, and a second subchamber that is disposed radially outward with respect to the first subchamber,
the diverter assembly, the first seal assembly and the second seal assembly are disposed in the first subchamber and each have a circular profile when viewed in a direction parallel to the rotational axis,
the diverter assembly has a first diameter,
the first seal assembly and the second seal assembly each have a second diameter, and
the first diameter and the second diameter are dimensioned to provide a sliding fit with respect to an inner surface of the first subchamber.

14. The valve of claim 13, wherein
an inner diameter of the second subchamber is greater than the first diameter and the second diameter.

15. The valve of claim 13, wherein the second subchamber is free of a flow diverting structure.

16. The valve of claim 1, wherein the first diverter part comprises:
a first diverter part base-facing surface;
a first diverter part lid-facing surface that is opposite to the first diverter part base-facing surface;
a first diverter part peripheral surface that surrounds the first diverter part base-facing surface and the first diverter part lid-facing surface;
the first diverter part through openings that extend between the first diverter part base-facing surface and the first diverter part lid-facing surface; and
the shaft, the shaft protruding from the first diverter part lid-facing surface in a direction substantially perpendicular to the first diverter part lid-facing surface.

17. The valve of claim 16, comprising a first seal assembly disposed in the chamber between the diverter assembly and the base wherein the first seal assembly includes
a first seal subassembly disposed between the diverter assembly and the base, the first seal subassembly being fixed relative to the base, the first seal subassembly including first through openings, each first through opening being axially aligned with a respective valve port, and
a second seal subassembly disposed between the first seal subassembly and the diverter assembly, the second seal subassembly being fixed relative to the diverter assembly, the second seal subassembly including second through openings that are axially aligned with the first diverter part through openings.

18. The valve of claim 17, wherein
a first static, fluid-tight seal is disposed between the first seal subassembly and the base,
a second static, fluid-tight seal is disposed between the second seal subassembly and the diverter assembly, and
a first dynamic, fluid-tight seal is disposed between the first seal subassembly and the second seal subassembly.

19. The valve of claim 17, wherein the valve comprises a second seal assembly disposed in the chamber between the diverter assembly and the lid wherein the second seal assembly includes
- a third seal subassembly disposed between the diverter assembly and the lid, the third seal subassembly being fixed relative to the diverter assembly, the third seal subassembly including third through openings that are axially aligned with the first diverter part through openings, and
- a fourth seal subassembly disposed between the first seal subassembly and the lid, the fourth seal subassembly being fixed relative to the lid, the fourth seal subassembly including fourth through openings that are axially aligned with recesses of the lid.

20. The valve of claim 19, wherein
- a third static, fluid-tight seal is disposed between the third seal subassembly and the diverter assembly,
- a fourth static, fluid-tight seal is disposed between the fourth seal subassembly and the lid, and
- a second dynamic, fluid-tight seal is disposed between the third seal subassembly and the fourth seal subassembly.

* * * * *